(12) United States Patent
Schmitzer et al.

(10) Patent No.: US 11,625,732 B2
(45) Date of Patent: Apr. 11, 2023

(54) METHOD FOR AUTHENTICATING AN OBJECT, PARTICULARLY A SECURITY ELEMENT, AND A SECURITY ELEMENT

(71) Applicant: KURZ Digital Solutions GmbH & Co. KG, Fürth (DE)

(72) Inventors: Benno Schmitzer, Zirndorf (DE); Uwe Frieser, Büchenbach (DE); Michael Grau, Neunkirchen am Brand (DE); Walter Kurz, Fürth (DE)

(73) Assignee: KURZ Digital Solutions GmbH & Co. KG, Fürth (DE)

( * ) Notice: Subject to any disclaimer, the term of this patent is extended or adjusted under 35 U.S.C. 154(b) by 547 days.

(21) Appl. No.: 16/613,708

(22) PCT Filed: May 17, 2018

(86) PCT No.: PCT/EP2018/062988
§ 371 (c)(1),
(2) Date: Nov. 14, 2019

(87) PCT Pub. No.: WO2018/211034
PCT Pub. Date: Nov. 22, 2018

(65) Prior Publication Data
US 2021/0174374 A1 Jun. 10, 2021

(30) Foreign Application Priority Data
May 18, 2017 (DE) .......................... 102017110892.0

(51) Int. Cl.
*G06K 19/06* (2006.01)
*G06Q 30/018* (2023.01)
(Continued)

(52) U.S. Cl.
CPC ......... *G06Q 30/0185* (2013.01); *G06F 21/64* (2013.01); *G06K 1/121* (2013.01);
(Continued)

(58) Field of Classification Search
CPC ............. G06Q 30/0185; G07D 7/0043; G06K 19/06093
(Continued)

(56) References Cited

U.S. PATENT DOCUMENTS

| 8,932,425 B2 | 1/2015 | Lutz et al. |
| 8,942,372 B2 * | 1/2015 | Kaulartz ................. G06F 21/10 700/215 |

(Continued)

FOREIGN PATENT DOCUMENTS

| CN | 1575484 A | 2/2005 |
| CN | 101084643 A | 12/2007 |

(Continued)

OTHER PUBLICATIONS

Japanese Office Action dated Jul. 26, 2022.
(Continued)

*Primary Examiner* — Paultep Savusdiphol
(74) *Attorney, Agent, or Firm* — Hoffmann & Baron, LLP

(57) ABSTRACT

A method for authenticating an object, particularly a security element for protecting value documents, ID documents and products, as well as a security element, a security document, a reader, an individualization device and a server for such a method. The method involves the steps: dividing a first code element into at least one first partial code element and one second partial code element, storing the second partial code element, arranging the first partial code element and/or a second code element on and/or in the object, jointly machine-capturing the first partial code element and the second code element by means of a reader, extracting the first partial code element and the second code element from the data captured by the reader, accessing the stored second partial code element using the second code element as a key, checking whether the code element resulting from merging
(Continued)

the extracted first partial code element and the stored second partial code element corresponds to the first code element.

48 Claims, 15 Drawing Sheets

(51) Int. Cl.
| | | |
|---|---|---|
| *G07D 7/0047* | (2016.01) | |
| *G07D 7/0043* | (2016.01) | |
| *G06F 21/64* | (2013.01) | |
| *G06K 1/12* | (2006.01) | |
| *G06K 7/14* | (2006.01) | |

(52) U.S. Cl.
CPC ......... *G06K 7/1413* (2013.01); *G06K 7/1417* (2013.01); *G06K 19/06028* (2013.01); *G06K 19/06037* (2013.01); *G06K 19/06065* (2013.01); *G06K 19/06093* (2013.01); *G06K 19/06159* (2013.01); *G07D 7/0043* (2017.05); *G07D 7/0047* (2017.05); *G07D 2207/00* (2013.01)

(58) Field of Classification Search
USPC .......................................... 235/494; 705/318
See application file for complete search history.

(56) References Cited

U.S. PATENT DOCUMENTS

| | | |
|---|---|---|
| 2005/0015610 A1 | 1/2005 | Moussette |
| 2005/0262338 A1 | 11/2005 | Irwin, Jr. |
| 2008/0130883 A1 | 6/2008 | Agaian et al. |
| 2009/0072526 A1 | 3/2009 | Peters et al. |
| 2012/0254052 A1* | 10/2012 | Gao ..................... G06Q 30/018 235/494 |
| 2016/0232734 A1 | 8/2016 | Guajardo Merchan et al. |
| 2016/0267369 A1* | 9/2016 | Picard .............. G06K 19/06037 |
| 2016/0307035 A1 | 10/2016 | Schilling et al. |
| 2018/0114083 A1* | 4/2018 | Richter ................ G06K 7/1491 |

FOREIGN PATENT DOCUMENTS

| | | |
|---|---|---|
| CN | 101088100 A | 12/2007 |
| CN | 101505220 A | 8/2009 |
| CN | 103794135 A | 5/2014 |
| CN | 105706107 A | 6/2016 |
| CN | 105809225 A | 7/2016 |
| CN | 105934779 A | 9/2016 |
| CN | 106250958 A | 12/2016 |
| DE | 102007044992 B3 | 12/2008 |
| DE | 102008001880 A1 | 1/2010 |
| DE | 102015207032 A1 | 10/2016 |
| JP | 2001-005924 A | 1/2001 |
| JP | 2006-244097 A | 9/2006 |
| JP | 2007-25738 A | 2/2007 |
| WO | 2006/049430 A1 | 5/2006 |
| WO | 2006/066322 A1 | 6/2006 |
| WO | 2012/000631 A2 | 1/2012 |

OTHER PUBLICATIONS

Baidu, "Analysis of two-dimensional code encryption anti-counterfeiting technology", Website: http://www.afctech.com/article/twodimension-code.html?ivk_sa=1024320u» May 20, 2014 Fan Caiyi.

* cited by examiner

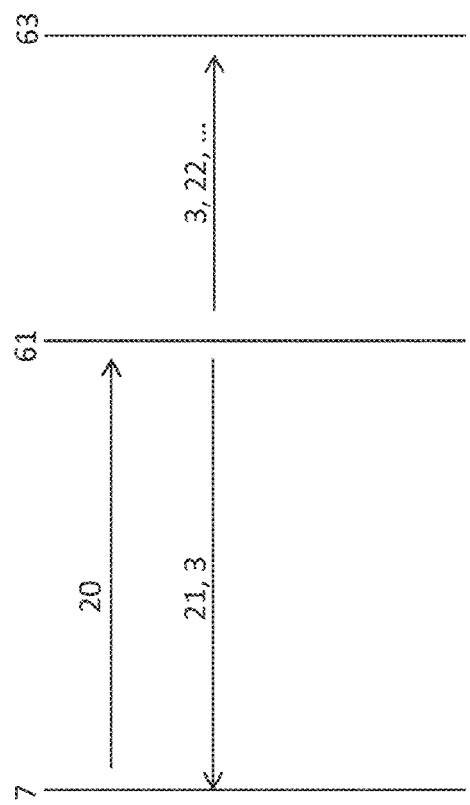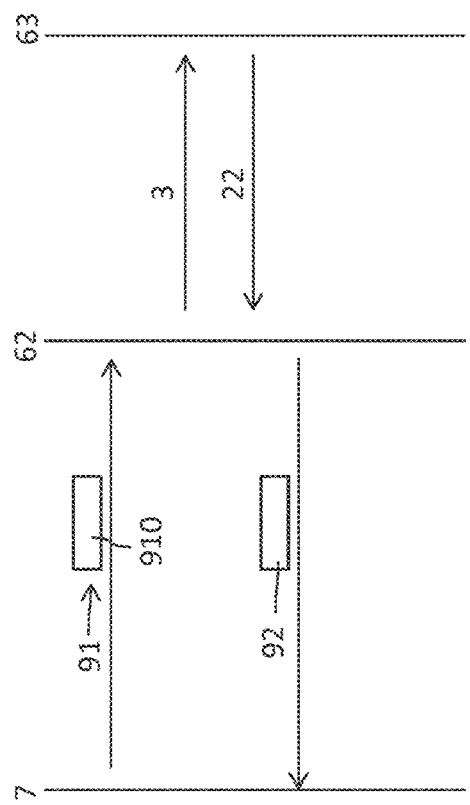

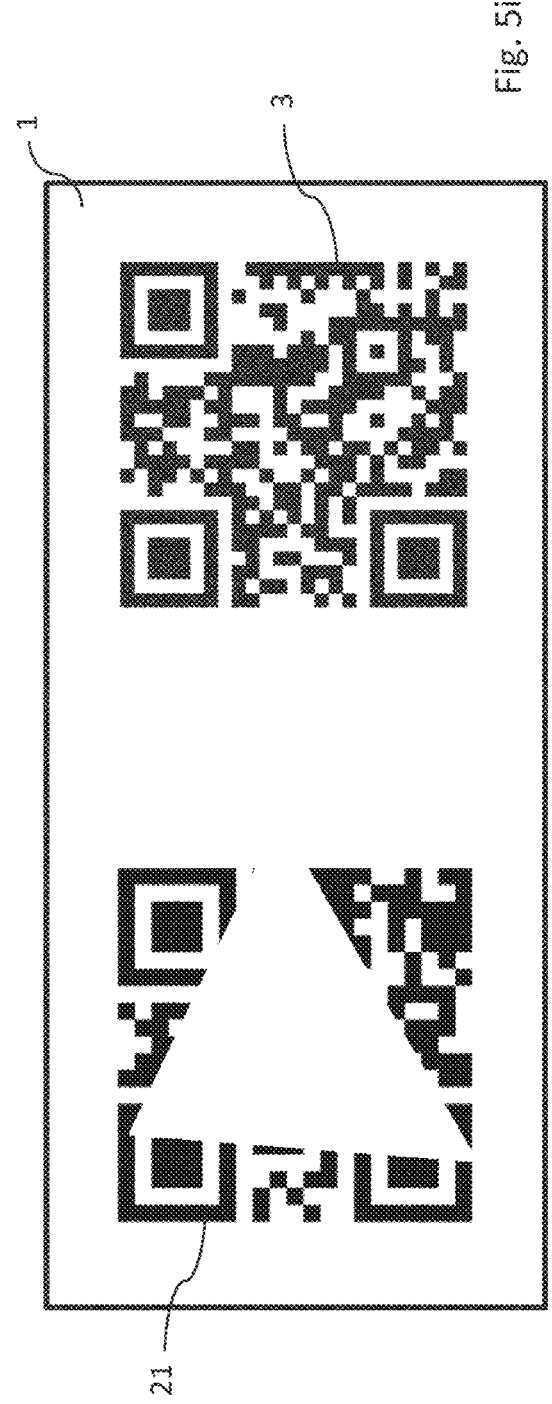

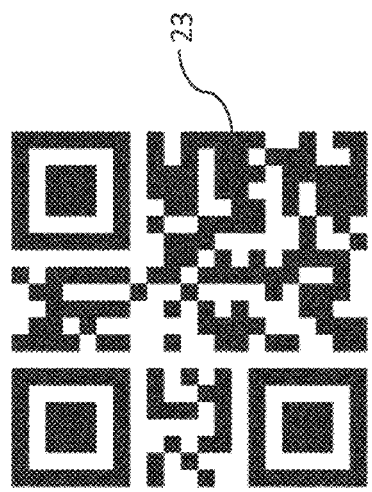
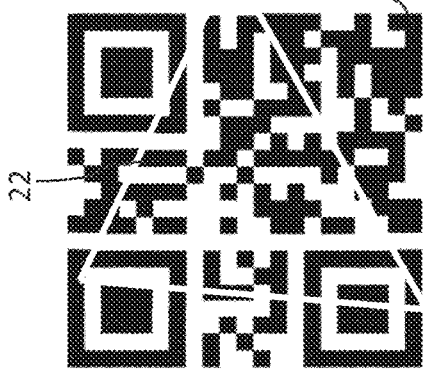
Fig. 5J

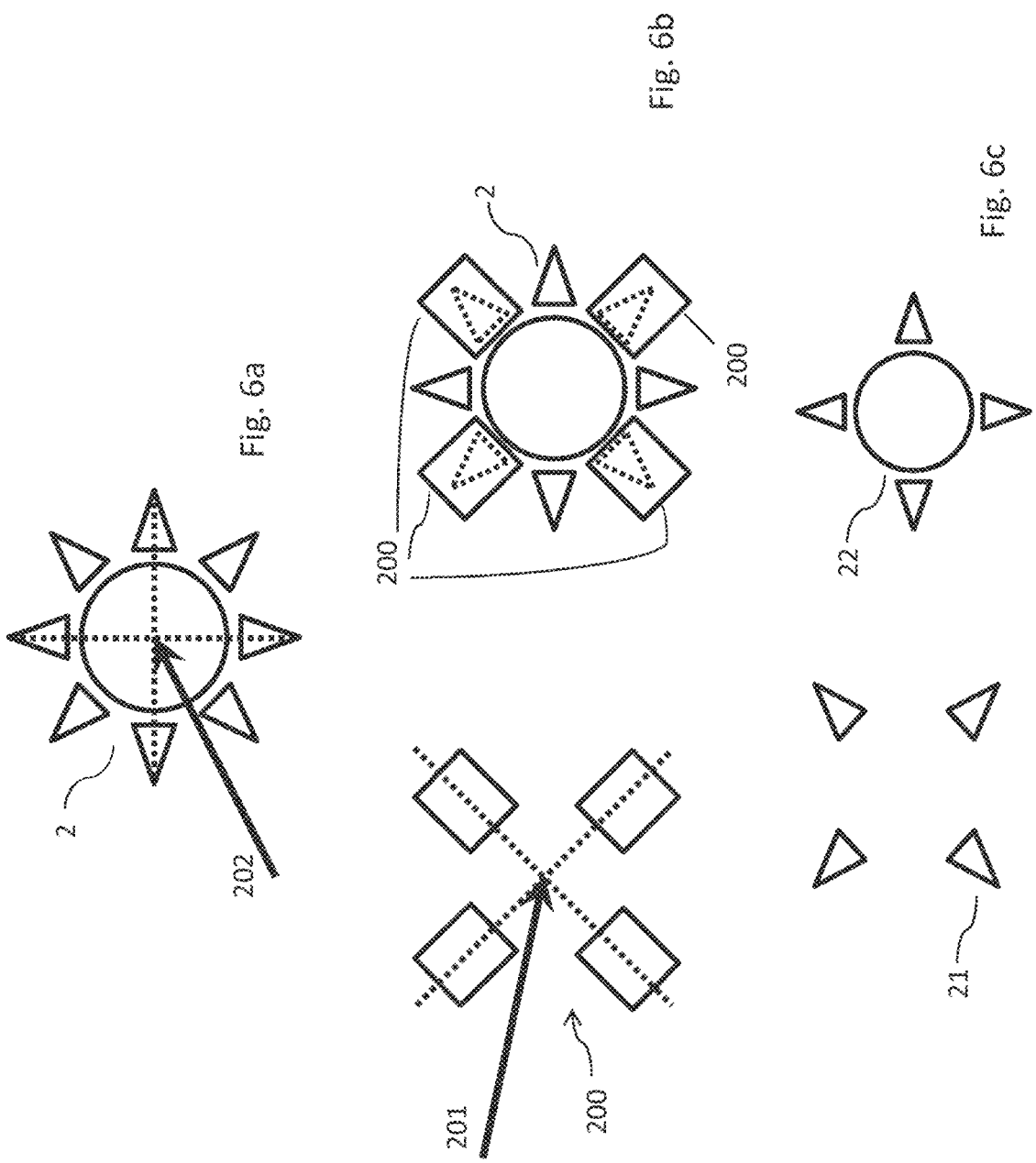

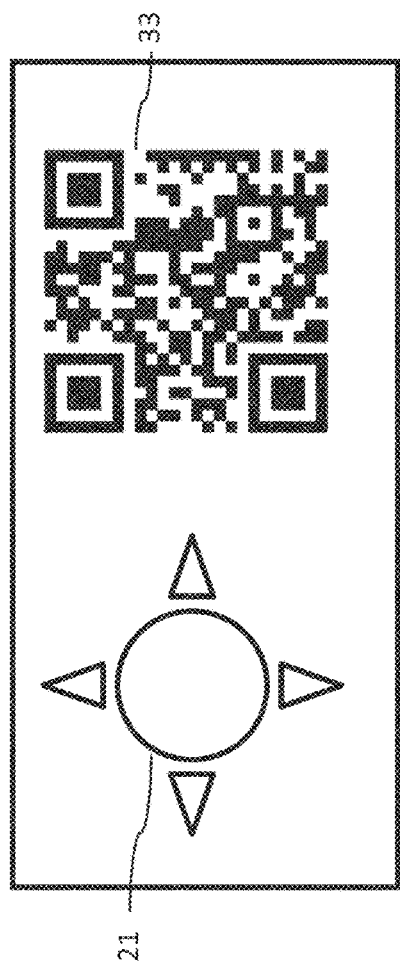
Fig. 6e
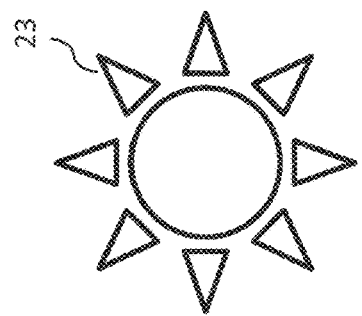
Fig. 6f
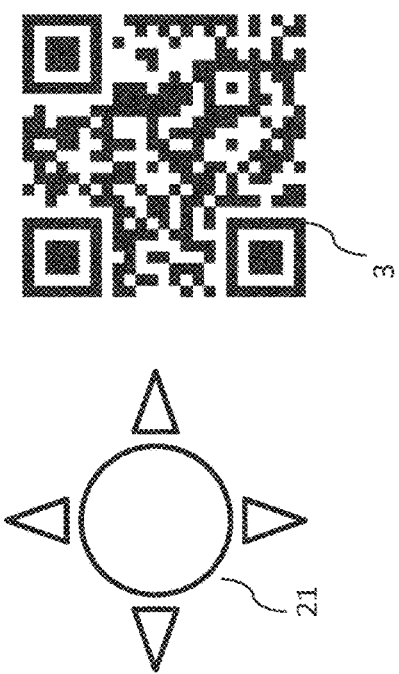
Fig. 6d
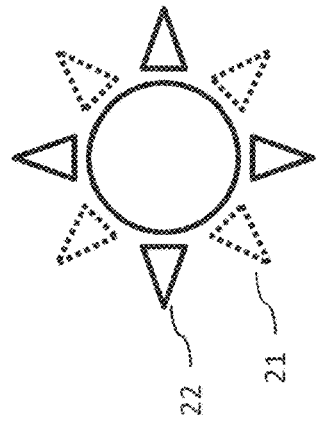

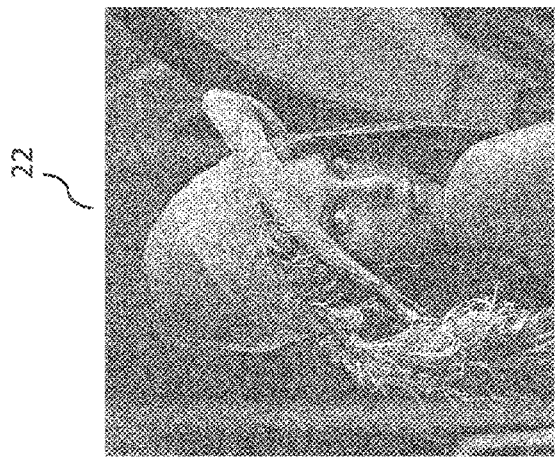
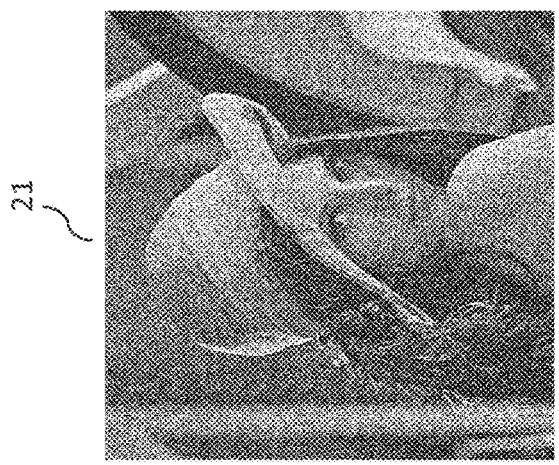
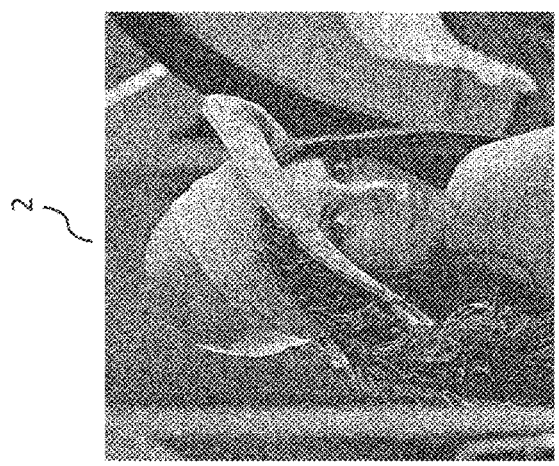
Fig. 7a
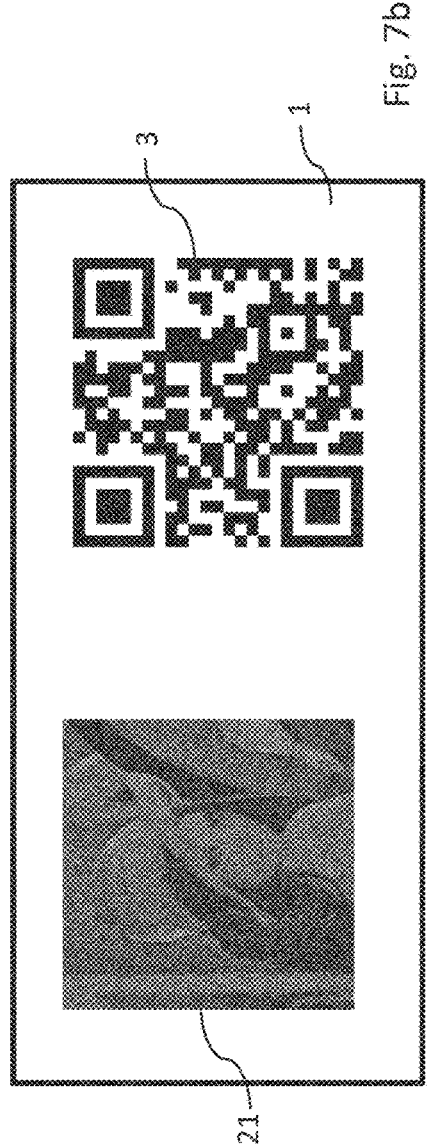
Fig. 7b

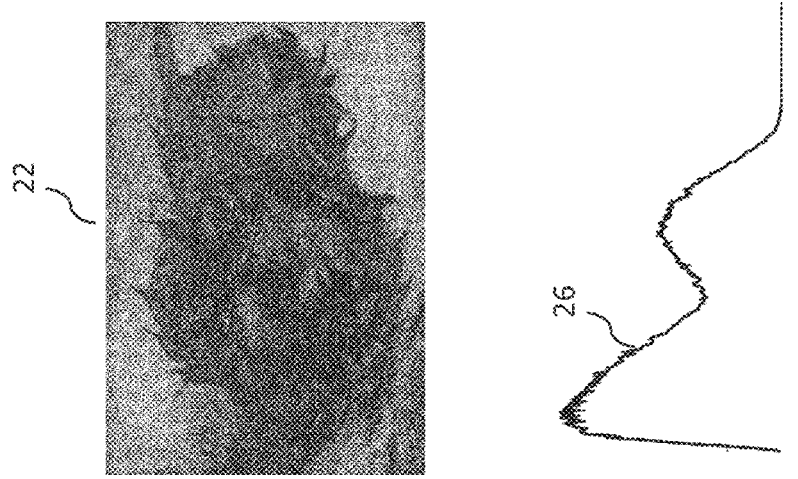
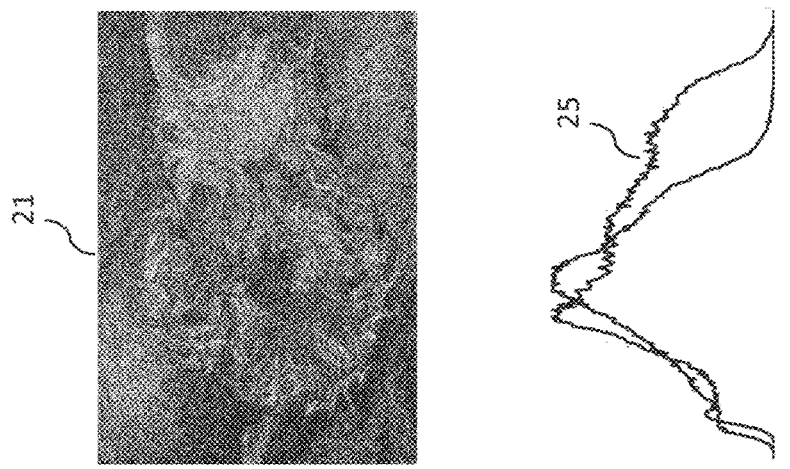
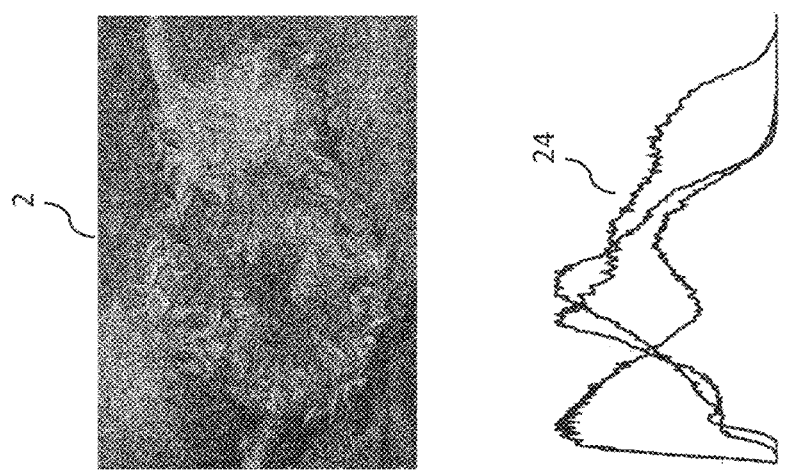
Fig. 8a

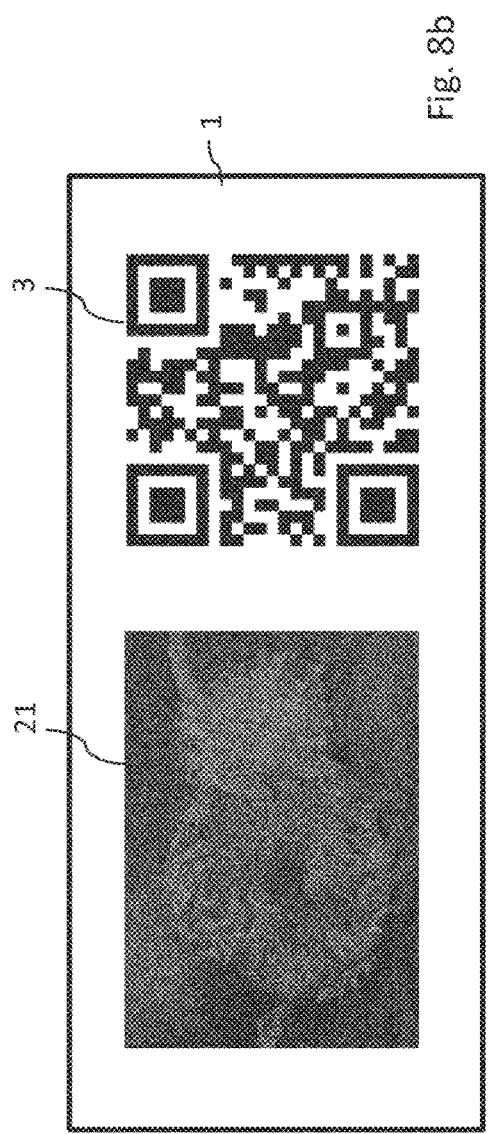
Fig. 8b
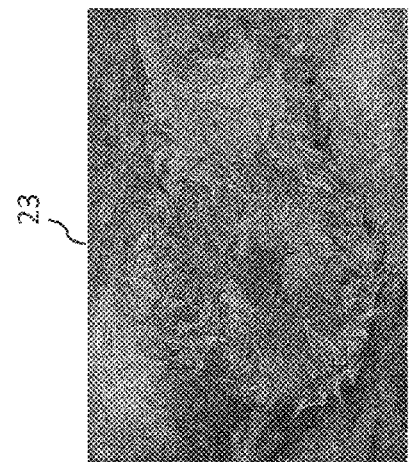
Fig. 8c
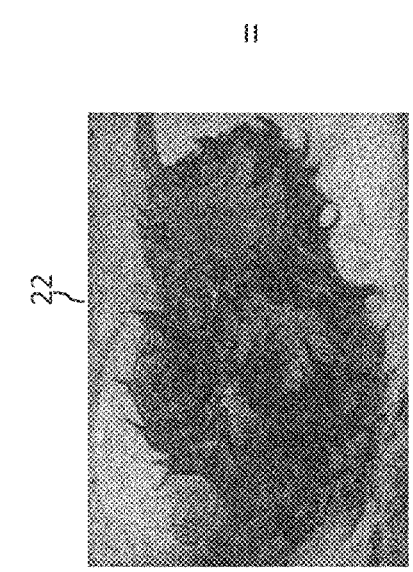
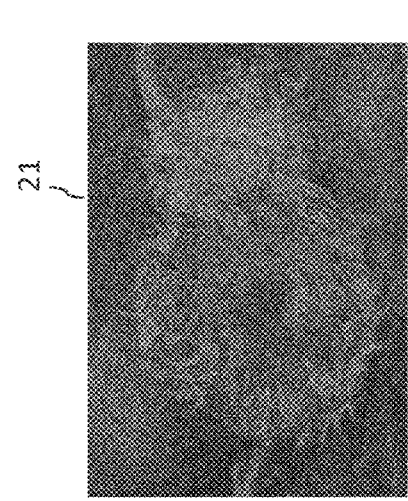

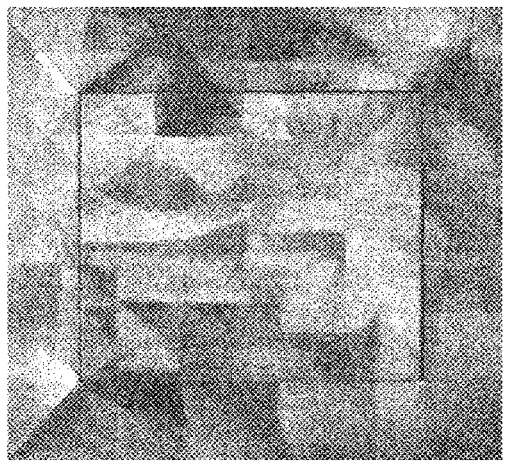 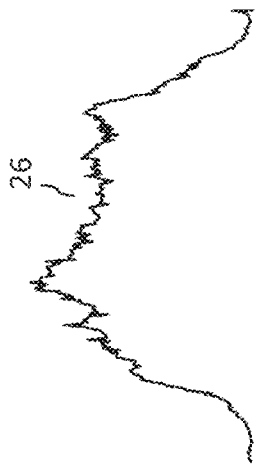
 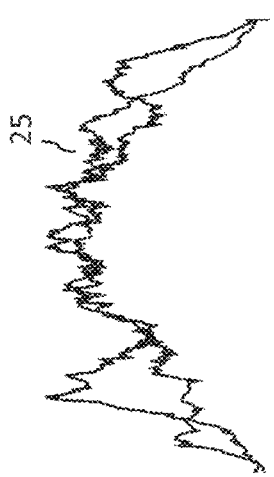
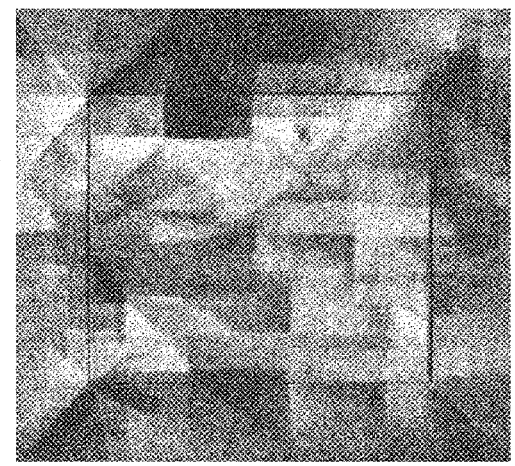 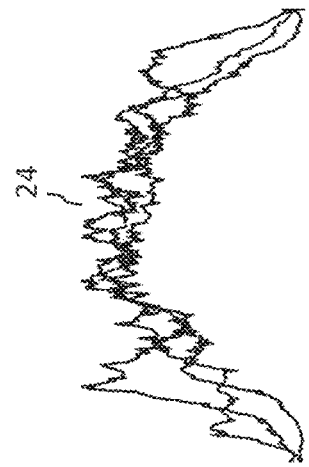
Fig. 9a

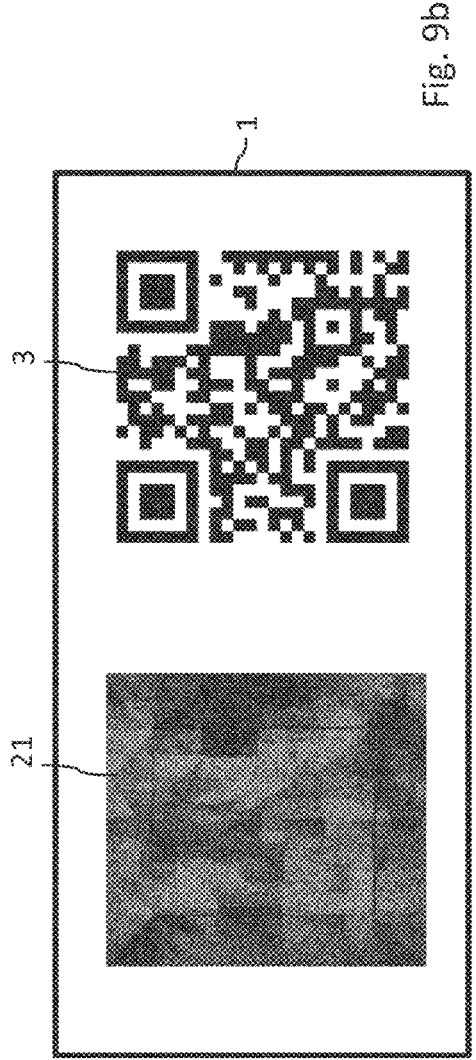
Fig. 9b
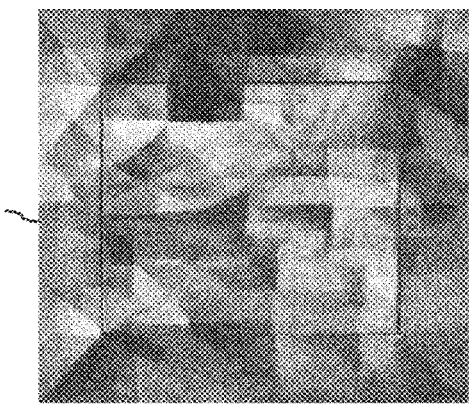
Fig. 9c
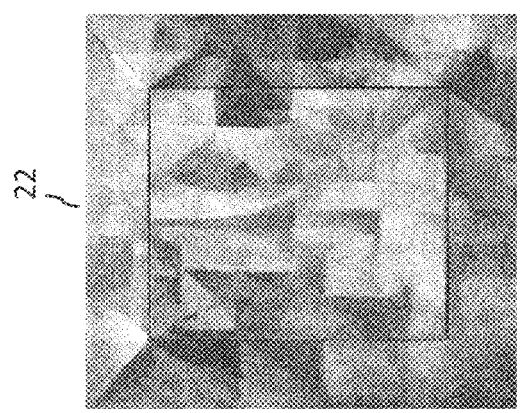

METHOD FOR AUTHENTICATING AN OBJECT, PARTICULARLY A SECURITY ELEMENT, AND A SECURITY ELEMENT

This application claims priority based on an International Application filed under the Patent Cooperation Treaty, PCT/EP2018/062988, filed May 17, 2018, which claims priority to DE 102017110892.0, filed May 18, 2017.

BACKGROUND OF THE INVENTION

The invention relates to a method for authenticating an object, particularly a security element for protecting value documents, ID documents and products. The invention further relates to a security element, a security document, a reader, an individualization device and a server for such a method.

Physical features are usually used for authenticating security documents and products. These can consist, for example, of a security print and/or also of optically variable security elements which display different optical effects at different observation and/or illumination angles. Such security elements usually have a uniquely defined optical design which can be verified visually by the observer.

It is further known to provide security elements with machine-readable optical markings. Thus, for example, WO 2012/000631 A2 describes an optically variable security element which has an individualized machine-readable optical marking. Through the use of such security elements, the protection against forgery is further improved, as the authenticity of the object can additionally also be checked by reading the individualized machine-readable marking.

However, the problem is that readers by means of which such optical markings can be read are becoming more and more widespread, and thus forgeries of such openly accessible optical markings are made easier.

SUMMARY OF THE INVENTION

The object of the invention is to improve the protection against forgeries.

This object is achieved by a method for authenticating an object, particularly a security element for protecting value documents, ID documents and products, which comprises the following steps:
dividing a first code element into at least one first partial code element and one second partial code element,
storing the second partial code element,
arranging the first partial code element and/or a second code element on and/or in the object,
jointly machine-capturing the first partial code element and the second code element by means of a reader,
extracting the first partial code element and the second code element from the data captured by the reader,
accessing the stored second partial code element using the second code element as a key and
checking whether the code element resulting from merging the extracted first partial code element and the stored second partial code element corresponds to the first code element.

This object is further achieved by a security element for protecting value documents, ID documents and products which has at least one first partial code element and/or one second code element. The first partial code element here is formed by dividing a first code element into the at least one first partial code element and one second partial code element, which is stored in a database. The first partial code element and/or the second code element are arranged in and/or on the security element in such a way that by joint machine capture of the first partial code element and the second code element by means of a reader and extraction of the first partial code element and second code element from the data captured by the reader it can be checked whether the code element resulting from merging the extracted first partial code element and the stored second partial code element corresponds to the first code element.

This object is further achieved by a server for authenticating an object. This server is designed such that it divides a first code element into at least one first partial code element and one second partial code element. The second partial code element and a second code element serving for access to the second partial code element or a second code assigned to the second code element is stored by the server in an internal or external database. The first partial code element and/or the second code element are sent by the server to an individualization device for arranging the first partial code element and/or the second code element on the object.

This object is further achieved by a server for authenticating an object which is designed as follows: the server receives from a reader data which contain a joint machine capture of a first partial code element and a second code element by the reader. The first partial code element and the second code element are extracted by the server from the data captured by the reader. The server accesses the stored second partial code element using the second code element as a key. It further checks whether the code element resulting from merging the extracted first partial code element and the stored second partial code element corresponds to the first code element.

This object is further achieved by a reader for authenticating an object. This reader is designed such that it jointly machine-captures at least one first partial code element and one second code element, which are arranged in particular in and/or on the object. The first partial code element here is formed by dividing a first code element into the at least one first partial code element and one second partial code element, which is stored in a database. Access to the stored second partial code element is possible using the second code element as a key.

This object is further achieved by an individualization device for individualizing an object. This individualization device is designed such that it arranges at least one first partial code element and/or one second code element in and/or on the object. The first partial code element here is formed by dividing a first code element into the at least one first partial code element and one second partial code element, which is stored in a database. Access to the stored second partial code element is possible using the second code element as a key.

Advantageous embodiments of the invention are described in the dependent claims.

Preferably, the first code element is formed of a sequence of alphanumeric characters, a sequence of numbers, a barcode, in particular a two-dimensional barcode, or a QR code (Quick Response Code) and/or a monochromatic or multi-colored image, in particular a graphic or a true-color image. The first code element here can also comprise one or more of the above-described components, and thus, for example, can comprise a sequence of alphanumeric characters combined with a true-color image or a graphic combined with a two-dimensional barcode.

The second code element preferably likewise consists of a sequence of alphanumeric characters, a sequence of numbers, a barcode, in particular a two-dimensional barcode or QR code and/or a monochromatic or multi-colored image, in particular a graphic or a multi-colored image or a true-color image.

The second code element can also have a combination of these components.

Preferably, the first code element and second code element here consist of different ones of the components mentioned above. Thus, the first code element consists for example of a graphic or a true-color image and the second code element consists of a sequence of alphanumeric characters or a QR code.

The above-mentioned selection of the components used for the first code element and the second code element makes it possible to further improve the protection against forgery. Thus, in particular if a monochromatic or multi-colored image is used as code element, the function of the code element is obscured for the forger, the imitation of the code element is made more difficult for the forger and the use of standard methods to capture the code elements is also prevented.

Preferably, the first partial code element and the second code element are arranged next to each other on and/or in the object. Here, the first partial code element and the second code element are preferably arranged spaced apart from each other by between 1 mm and 50 mm, preferably between 1 mm and 25 mm, particularly preferably between 1 mm and 15 mm.

Preferably, the first partial code element and the second code element are arranged flush with each other in the horizontal or vertical direction on and/or in the object. This arrangement can make the later extraction or separation of the first partial code element and the second code element easier.

By spacing apart is meant here the spacing apart of the points of the first partial code element and the second code element which have the smallest distance from each other.

This arrangement of the two code elements firstly ensures that the arrangement of the code elements relative to each other can be further included in the authentication process. Further, a mutual protection of the two code elements is also brought about because if one of the code elements is manipulated by a forger the other code element is normally also affected, and forgeries are thus easily detectable.

Preferably, the first partial code element and the second code element are arranged within an area the lateral dimensions of which lie between 25 mm and 100 mm, preferably between 50 mm and 250 mm, particularly preferably between 50 mm and 150 mm.

By lateral dimensions are meant here the dimensions which lie in the plane spanned by the surface of the object. Thus, if for example the object is formed of a security element for protecting products, for example a label or a film, then the lateral dimensions represent the length and/or width dimensions when observed in a top view of the label or film.

Preferably, the first partial code element and the second code element are optically captured jointly by the reader. Thus, for example, a camera can be used for the optical capture of the first partial code element and the second partial code element.

During the capture the reader preferably generates an image dataset which contains an optical copy of an area of the object comprising the first partial code element and the second code element.

The image dataset can contain bitmap data in black/white or as grayscale or color information. The image dataset can, as an alternative or in addition to bitmap data, also contain vector information or also additional control information or meta-information.

This image dataset is preferably transmitted by the reader to a server via a communications network. This has the advantage that firstly the reader is relieved of the effort of extracting the first partial code element and the second code element from the image dataset. Further, this has the advantage that in the reader no information is available which makes it possible to extract the first partial code element and the second code element from the common dataset, for example corresponding specifications for the size dimensions and/or positional arrangements of the first partial code element and the second code element relative to each other. Thus, even with a stolen reader it is already made more difficult for the forger to carry out a corresponding extraction of the first partial code element and the second code element from the captured data.

Carrying out the extraction and check of the first partial code element and the second code element is preferably carried out by the server. The latter then transmits the result of the check to the reader via the communications network.

The extraction of the first partial code element and the second code element from the image dataset is preferably effected by means of carrying out an image, code and/or text recognition. This extraction is preferably effected with corresponding knowledge of the arrangement and lateral extent of the first partial code element and the second code element on or in the object, as well as further of the type of code element used, i.e. whether the code element is for example a sequence of alphanumeric characters, a barcode or an image.

Thus, if for example a sequence of alphanumeric characters is used as code element, then the extraction of the code element from the image dataset can be carried out for example by means of carrying out a text recognition over the area of the image dataset which is assigned to the corresponding code element because of the arrangement of the code elements. If the code element consists for example of a barcode, then the code element can be extracted by means of carrying out a code recognition, for example a barcode recognition, over the area of the image dataset assigned to the code element. If the code element is an image, then the corresponding partial area of the image dataset assigned to the code element is extracted from the image dataset, for example by means of image processing and/or image recognition algorithms.

According to a preferred embodiment example of the invention, the division of the first code element and the later check are effected as described in the following:

The division of the first code element into the at least one first partial code element and into the second partial code element is preferably effected by means of applying a template. Here, the procedure is preferably as follows:

Firstly, the first code element is generated. The generation of the first code element here is preferably effected in such a way that the first code element contains or forms a bijective first code.

Bijective means that the code is in each case allocated only once within a series. In the simplest case this can be brought about subsequently a generation in the sense of a serial number or by means of a random number generator which has this property.

Thus, for example, a bijective first code, for example a sequence of alphanumeric numbers, can first be generated. This first code is then converted for example into a two-dimensional barcode which forms the first code element.

Further, it is also possible for the first code element to consist of a preferably randomly selected or modified monochromatic or multi-colored image, for example a graphic or a true-color image. Here too, for example the modification parameters can be specified by a randomly chosen first code.

Further, it is also possible for a randomly chosen sequence of alphanumeric characters for example to be used as first code element, and thus for the first code and the first code element to match.

Further, a reference point of the template and a reference point of the first code element are preferably determined. This reference point can be for example the center of area of the template or of the first code element.

The template is preferably randomly or pseudo-randomly generated and/or randomly or pseudo-randomly selected from a set of predefined templates. The protection against forgery is hereby further improved. However, it is also possible for one and the same template to be used for the division of an entire group of first code elements which are attached to respectively assigned different objects.

The application of the template to the first code element is preferably carried out on the basis of the reference point of the first code element and/or the reference point of the template. This is advantageous when the template only covers a partial area of the first code element and does not define uniform filter criteria for the entirety of the first code element.

According to a preferred embodiment example of the invention, the template is applied to the first code element as follows:

The template is superimposed with the first code element. Preferably, this superimposition is effected here in such a way that the superimposition is effected covering the reference point of the first code element and the reference point of the template, i.e. the positioning of the template on the code element is defined by the position of the reference points.

For the division of the first code element, the partial area of the first code element in which the template and the first code element are not superimposed is then assigned to the first partial code element. Furthermore, the partial area of the first code element in which the template and the second code element are superimposed is assigned to the second code element. The assignment can alternatively also be effected conversely. In other words, the partial area in which the template does not superimpose the code element are assigned to the second partial code element and the remaining partial area are assigned to the first partial code element.

Studies have shown that a very high level of protection against forgery is already achieved with such an application of the template, with a comparatively small computational outlay. The high level of protection against forgery here already results because no known cryptographic methods are used, but rather a quite different approach is followed, and thus a forgery by means of usual methods also does not come into question here.

Further, it is advantageous if the template is formed of an optical filter function which defines one or more filter criteria preferably depending on location, Such filter criteria can be selected for example from lightness values, contrast values, color values, spectral region and/or polarization.

In a preferred case, the template thus consists of an optical filter function which for example assigns one spectral component of the first code element to the first partial code element and the remaining spectral components of the first code element to the second partial code element. Thus, for example, in the case where the first code element is formed of a multi-colored image or a true-color image with the color channels RGB (R=red, G=green, B=blue), for example the red channel can be assigned to the first partial code element and the remaining channels, thus the green and the blue channels, can be assigned to the second partial code element. In this case, the template thus consists of a filter function which defines the red spectral region, thus the red channel of the RGB image, as filter criterion independently of location.

However, the filter criteria here are preferably defined not independently of location, but depending on location, Thus, for example, the above-mentioned division of the red, green and blue channels is carried out only in an area defined by the template, but no such division or else a different division is performed in the remaining area. There, for example, the blue channel can be assigned to the first partial code element and the red and the green channels can be assigned to the second partial code element by the template.

It is thus advantageous that when the template is applied to the first code element, the filter function of the template is superimposed the first code element, and for the division of the first code element, depending on location or independently of location, a first part of the spectrum of the first code element determined by the one or more filter criteria of the template is assigned to the first partial code element and the remaining part is assigned to the second partial code element. In the case of such an application of the template, it is further advantageous if the superimposition is carried out on the basis of the reference points of the first code element and of the template.

Instead of filter criteria which are based on the red, green and blue channels of an RGB image or multi-colored or multi-channel image, it is also possible to use any other spectral filter functions which are not geared to these primary colors or spectral colors. It is hereby further possible to also increase the protection against forgery significantly.

Further, it is also possible, instead of the filter criterion "color value" or "spectral region", to use others of the above-named filter criteria analogously or to use several of the filter criteria in combination. The protection against forgery can also be further improved hereby.

Further, it is also advantageous that when the template is applied to the first code element, the filter function of the template is superimposed with the first code element, and for the division of the first code element, depending on location, the respective image point of the first code element is assigned to the first partial code element or to the second partial code element depending on whether the one or more filter criteria are met. Thus, for example, all image points which have a lightness value below a lightness value specified by the filter criteria can be assigned to the first partial code element, and the remaining image points can be assigned to the second partial code element. Further, for example, the image points in which the proportion of for example the red channel exceeds a value set by the filter criterion can be assigned to the first partial code element, and the remaining image points can be assigned to the second partial code element. These filter criteria can be further combined with each other as desired and also with the above-mentioned examples of the application of the template.

Further, it has proved to be advantageous to choose the template or the reference points such that the template only superimposes a partial area of the first code element, preferably superimposes between 25% and 75%, preferably between 40% and 60% of the surface area of the first code element. The protection against forgery can hereby be further improved.

Further, it has proved to be advantageous that the template is generated and superimposed by the first code element in such a way that the template is arranged completely within the surface area of the first code element during the superimposition. The protection against forgery is also further improved hereby.

Preferably, the template is superimposed with the first code element in such a way that the bijection of the first code element no longer exists. The advantage is hereby achieved that, firstly, it is no longer possible, even by means of cryptographic methods, to deduce the first code element, and even the use of correspondingly designed readers merely leads to an error message. The protection against forgery is thus further improved.

The application of the template to the first code element is in particular effected in each case as an electronic representation of the template onto an electronic representation of the first code element. Such an electronic representation is present for example in the form of a respective image dataset. In other words, in particular, electronic algorithms, for example filter, image processing and image recognition algorithms, are applied to these electronic representations and the result of the processing again represents an electronic representation.

Merging the first partial code element and the stored second partial code element is preferably carried out by superimposition of the extracted first partial code element and the stored second partial code element, preferably on the basis of the reference point of the template and of the first code element. Thus, for example, the image datasets which correspond to the first partial code element and the stored second partial code element are correspondingly superimposed on the basis of an overlapping of the reference points, and thus a corresponding image dataset resulting from the merging is generated.

Merging the first partial code element and the stored second partial code element is also effected in particular by means of the electronic representations of the first partial code element and of the stored second partial code element, and the result of the merging again represents an electronic representation.

The check of whether the code element resulting from the merging corresponds to the first code element is preferably carried out as follows:

If, for example, the first code element is a sequence of alphanumeric characters or a barcode, the procedure can be as follows: by means of carrying out a text recognition, for example OCR recognition, or a barcode recognition on the image dataset corresponding to the merging, the sequence of alphanumeric characters or the sequence of alphanumeric characters corresponding to the barcode is determined. Carrying out the check can then be implemented by comparing this sequence of characters with the sequence of alphanumeric characters corresponding to the first code or that corresponding to the first code element. Further, the check can also be effected by comparing checksums of these sequences of alphanumeric characters, as also described further below.

If the first code element is an image or a graphic, the procedure can be as follows: by means of carrying out an image recognition on the image dataset corresponding to the merging, one or more specific characteristic values and/or characteristic image elements are determined by means of image processing or image recognition algorithms. To carry out the check, these are compared with corresponding characteristic values specifying the first code element, which are stored in the database for the second partial code element.

However, it is further also possible to carry out a detailed image comparison of the image dataset corresponding to the merging with a corresponding image dataset of the first code element, which is stored for the second partial code element in a database.

It is particularly advantageous here if the check is based on the use of checksums:

Thus, a checksum of the first code element or of the first code is preferably ascertained and this checksum is stored for the second partial code element or as part of the second partial code element. Thus, if in a simple case the first code element consists of a sequence of alphanumeric characters, for example a corresponding checksum is calculated and this is stored for the second partial code element or as part of the second partial code element. If the first code element consists for example of a barcode which represents a sequence of alphanumeric characters specifying the first code, a checksum is calculated for the first code and this is then stored as part of the second partial code element or for the second partial code element. Further, it is also possible to calculate a corresponding checksum on the basis of a code element which is formed of an image in order then to proceed correspondingly subsequently.

During the check of whether the code element resulting from merging the extracted first partial code element and the stored second partial code element corresponds to the first code element, the procedure in the following is as follows:

First of all, a checksum of the code element resulting from the merging is ascertained. This checksum is compared with the checksum stored for the second partial code element or as part of the second partial code element. If the first code element consists for example of a sequence of alphanumeric characters, the checksum of the sequence of alphanumeric characters resulting after merging is calculated and correspondingly compared. If the code element is a barcode, after a barcode recognition has been carried out on the merge the resultant sequence of alphanumeric characters is ascertained, the checksum is calculated from this and that is compared with the stored checksum. This applies correspondingly to the use of the image as first code element.

The method preferably further also comprises the generation of the first and/or second code element.

Preferably, the first or second code elements are generated bijectively, for example by means of a corresponding random generator, or generated in the form of a consecutive sequence of numeric or alphanumeric characters.

Further, it is also possible for the generation of the second code element to be effected on the basis of a previously determined first or second code. Thus, for example, a bijective first or second code can be generated in the form of a sequence of alphanumeric characters, as described above, and from this the second code element, for example a barcode or a corresponding (modified) image, can then be generated.

The second code element serves to locate or uniquely reference the stored second partial code element. The access to the stored data can then be effected either by direct use of the second code element or by the indirect use thereof. For example by converting the first code element into the first code and/or a key assigned to it which is used to locate the second partial code element in the memory in particular in a database.

Preferably, the second code element, the second code or the key assigned to the second code are thus, on the one hand, stored in a database. Further, assigned to this, the second partial code element, optionally the reference point of the first code element, optionally the reference point of the template and optionally further items of information which are used for the check, is stored. These can, as already stated above, be formed for example of a corresponding checksum of the first code or first code element, of the first code element or the first code or of a corresponding set of characteristic values which specify the first code element or the first code.

These data are preferably stored in a common dataset in a database.

As already stated above, the first partial code element and/or the second code element are preferably applied in and/or to a common object, in particular a security element or value document. However, it is also possible not to arrange the first partial code element and the second code element correspondingly next to each other until the joint machine capture.

Preferably, the first partial code element and/or the second code element are introduced into and/or applied to at least one film element of the object. The introduction into the film element is preferred here, as a corresponding forgery and also imitation is hereby made significantly more difficult because of the lack of opportunities for direct access to the first partial code element or the second code element.

To increase the protection against forgery, the film element preferably further has one or more layers which comprise one or more of the following elements individually or in combination;

Thus, these layers preferably comprise an optical active relief structure. Thus, for example, a diffraction grating, a hologram, a zero-order diffraction structure, a blazed grating, a macrostructure, in particular a lens structure or microprism structure, a mirror surface, a matte structure, in particular an anisotropic or isotropic matte structure, is preferably provided. Further, these layers preferably have further elements individually or in combination, selected from volume hologram, a thin-film structure with color-change effect, a liquid crystal material, preferably a nematic or cholesteric liquid crystal material, dyes and/or pigments, preferably phosphorescent pigments, luminescent pigments, thermochromic pigments and/or optically variable pigments.

The film element is preferably formed of the transfer ply of a hot-stamping film or cold-stamping film. Further, it is also possible for the film element to be formed of a laminating film or a security thread.

The first partial code element and/or the second code element are introduced into the film element preferably by means of a laser. Through this laser, one or more layers of the film element can preferably be ablated or perforated in areas or excited to change their optical properties.

Further, it is also advantageous if the first partial code element and/or second code element are introduced into the film element by means of a digital printing process, in particular by means of inkjet printing or thermal-transfer printing. Here, one or more individualized layers are preferably overprinted onto the film element by means of these printing processes before application of the film element to the object. This has the advantage that the first partial code element or the second code element is arranged deep inside the layer system of the film element and as a result can be forged or imitated only with extreme difficulty.

Further, it is possible for the first partial code element and/or the second code element to be applied to the film element by means of a digital printing process, in particular by means of inkjet printing or thermal-transfer printing. This overprinting can be effected before or after the application of the film element to the object. Here too, one or more individualized layers can be applied to the film element by means of these printing processes, in particular can be overprinted after application of the film element.

Further, it is also possible for the first partial code element and/or the second code element to be introduced by individualized stamping of the film element out of a transfer film. For this, an individualized adhesive layer is preferably overprinted onto the transfer film by means of a digital printing process during transfer of the transfer ply to the object. During the transfer, only the areas provided with the adhesive layer are subsequently then transferred to the object, with the result that the shaping of the film element corresponds to the first partial code element and/or to the second code element. UV-curable adhesive layers are preferably used as adhesive layer for this.

The film element is preferably fixed on a surface of a carrier substrate of the object, in particular by means of an adhesive layer.

Further, it is advantageous to introduce the film element into a carrier substrate of the object in particular in the form of a security thread, further preferably in the form of a window security thread. For this, the film element is introduced into the carrier substrate preferably register-accurate in the form of a security thread. This happens in such a way that the first partial code element and the second code element are provided in an area of the carrier substrate in which the first partial code element and/or the second code element are easily recognizable in reflected-light observation. This easy recognizability can be achieved for example by reducing the layer thickness of the carrier substrate in this area for example in the form of a window or half-window, with the result that the surface of the security thread there is not covered with the material of the carrier substrate.

By register or registration, or register accuracy or registration accuracy, is meant a positional accuracy of two or more elements and/or layers relative to each other. The register accuracy is to range within a predefined tolerance, which is to be as small as possible. At the same time, the register accuracy of several elements and/or layers relative to each other is an important feature in order to increase the process stability. The positionally accurate positioning can be effected in particular by means of sensory, preferably optically detectable registration marks or register marks. These registration marks or register marks can either represent special separate elements or areas or layers or themselves be part of the elements or areas or layers to be positioned.

Further, it is also possible for the first partial code element and/or the second code element to be applied to the object or a carrier substrate of the object by means of a digital printing process, in particular by means of inkjet printing or thermal-transfer printing. Further, the first partial code element and/or the second code element can also be introduced into the object or a carrier substrate of the object by means of a laser.

Preferably, the first partial code element and the second code element are arranged in and/or on the object by means of different processes. Thus, for example, the second code element can be overprinted onto a carrier substrate by means of a digital printing process and the first partial code element can be introduced into a film element which is applied in or to the carrier substrate. Alternatively, for example, the first partial code element can be overprinted onto a carrier substrate by means of a digital printing process and the second code element can be introduced into a film element which is applied in or to the carrier substrate. The protection against forgery can hereby be still further significantly increased.

BRIEF DESCRIPTION OF THE DRAWINGS

The invention is explained by way of example in the following with reference to several embodiment examples.

FIG. 1b shows a schematic cross section through the security element according to FIG. 1a.

FIG. 2c show schematic cross sections through the object according to FIG. 2a.

FIG. 4a and FIG. 4b show flow diagrams.

FIG. 5a to FIG. 5j schematically illustrate a first and a second code element, a division of the first code element into a first partial code element and a second partial code element as well as the merging of the first partial code element and the second partial code element, FIG. 6a to FIG. 6f schematically illustrate a first and a second code element, a division of the first code element into a first partial code element and a second partial code element as well as the merging of the first partial code element and the second partial code element, FIG. 7a and FIG. 7b schematically illustrate the structure of a first code element, of a first partial code element and of a second partial code element, as well as of a security element.

FIG. 8a to FIG. 8c and FIG. 9a to FIG. 9c schematically illustrate a division of a first code element into a first and a second partial code element, as well as a merging of the first partial code element and the second partial code element.

DETAILED DESCRIPTION OF THE PREFERRED EMBODIMENTS

Figure 1A:
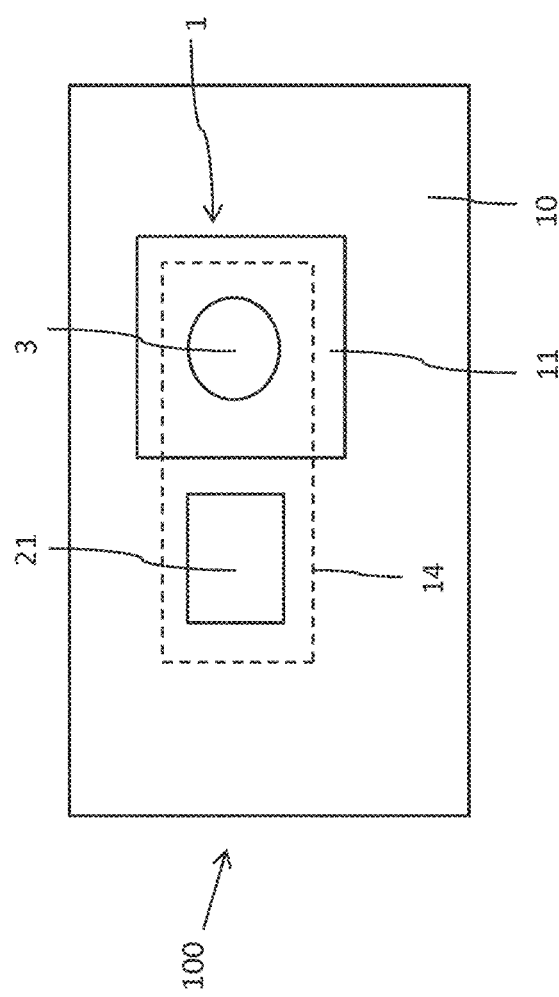
FIG. 1a shows a schematic top view of a security element.
Figure 1B:
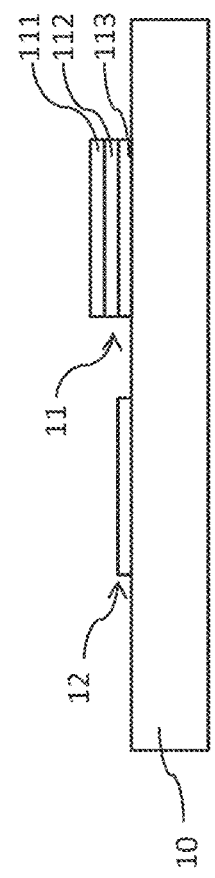

FIG. 1a and FIG. 1b illustrate by way of example the structure of a security document 100, FIG. 1a shows the security document 100 in top view and FIG. 1b shows it in cross section.

The security document 100 preferably consists of an ID document, for example a passport, a passport card or an access card. Here, however, it can also be a value document, for example a banknote or a security, a credit card, bank card or also a label for protecting products.

The security document 100 has a carrier substrate 10 and one or more security elements, of which the security element 1 is shown in FIG. 1a and FIG. 1b.

The security elements here can be applied to the carrier substrate 10 of the security document 100, or can be embedded in the carrier substrate 10 of the security document 100, in particular can be completely or partially embedded.

The security element 1 has a first partial code element 21 and a first code element 2. These are preferably arranged next to each other within an area 14.

In the embodiment example according to FIG. 1a and FIG. 1b, the security element 1 is formed of an overprint 12 and a film element 11, which are applied to the carrier substrate 10 of the value document 100. However, it is also possible, firefly, for the security element 1 to be able to have a carrier substrate of its own, to which the overprint 12 and the film element 11 are applied. Further, it is also possible for the security element 1 to be formed exclusively of an overprint or a film element, which can optionally further also be applied to a carrier substrate. Further, it is also possible for the security element 1 to be formed of the film element 11 onto which the overprint 12 is overprinted, optionally further also in combination with an independent carrier substrate of the security element 1.

The carrier substrate 10 is formed single-ply or multi-ply. In one embodiment, the carrier substrate 10 comprises a paper substrate with a thickness of between 20 μm and 200 μm and/or a plastic substrate, preferably a polycarbonate film or an ABS film or a PET film with a thickness of between 20 μm and 1000 μm. Further, the carrier substrate 10 can also comprise one or more protective layers and/or one or more decorative layers and/or one or more adhesion-promoter layers and/or one or more functional layers and/or one or more barrier layers and/or one or more security features. Thus, for example, the carrier substrate 10 can also comprise an electronic circuit, in particular an RFID chip, in which information is stored.

The film element 11 consists of a film element which is preferably manufactured independently of the production of the carrier substrate and is not applied to the carrier substrate 10 or embedded in the carrier substrate 10 until during the production of the security, document 100.

The film element 11 is preferably formed of the transfer ply of a transfer film, in particular of a hot-stamping film or cold-stamping film, or of a laminating film. The film element 11 here can completely cover the surface of the security document and/or only partially cover it, for example be in strip or patch form, as is provided for example in the case of the film element 11 according to FIG. 1a.

The film element 11 preferably has one or more protective layers 111, one or more decorative layers 112 and one or more adhesive or adhesion-promoting layers 113.

The decorative layers 112 of the film element firstly preferably form one or more security features, which are preferably also optically recognizable for the human observer. For this, the decorative layers 112 have for example one or more of the following layers:

The decorative layers 112 preferably have one or more metallic layers which are preferably provided in the film element 11 in each case not over the whole surface, but only partially. The metallic layers here can be formed opaque, translucent or transmissive. Preferably, the metallic layers here are formed of different materials which have a clearly different reflection and/or transmission spectrum. For example, the metal layers are formed of aluminum, copper, gold, silver or an alloy of these metals.

The decorative layer 112 can further comprise one or more color layers. These color layers are preferably color layers which are applied by means of a printing process.

The color layers preferably have one or more dyes and/or pigments which are incorporated in a binder matrix. These pigments are preferably luminescent pigments, thermochromic pigments and/or optically variable pigments, for example platelet-like interference layer pigments.

The decorative layer 112 preferably has one or more optically active relief structures, which are preferably introduced in each case into the surface of a replication varnish layer. These relief structures are preferably diffractive relief structures, such as for example holograms, diffraction gratings, asymmetrical diffraction gratings, zero-order diffraction structures. These relief structures can further also be isotropic and/or anisotropic matte structures, blazed gratings and/or relief structures acting substantially in refraction, in particular microlenses, microprisms or micromirrors.

The decorative layer 112 further preferably has one or more interference layers, which reflect or refract the incident light in a wavelength-selective manner. These layers can be formed for example of thin-film elements which generate a color shift effect dependent on the angle of view. This happens based on an arrangement of layers which have an optical depth in the region of a half or a quarter wavelength of the incident light. These layers preferably have a spacer layer, in particular arranged between an absorption layer and a reflective layer. Further, these layers can also have thin-film pigments.

The decorative layer 112 further preferably has one or more liquid crystal layers. These can generate a polarization of the incident light and/or also a wavelength-selective reflection and/or transmission of the incident light and thus a color shift effect dependent on the angle of view.

The adhesive layer 113 is preferably an adhesive layer which is formed of one or more heat-activatable adhesives and/or adhesives curable by means of UV radiation.

The second code element 3 is introduced into the film element 11 preferably by means of a laser. By means of the laser, in areas one or more layers of the film element 11 are ablated, perforated and/or excited to change their optical properties, for example blackened, bleached, dyed. Thus, it is possible for example to ablate or perforate one of the metallic layers of the decorative layer 112 in areas by means of a laser, with the result that they have recesses, the shaping of which forms the second code element 3. Further, it is also possible for the decorative layer 112 to have one or more laser-sensitive layers which are excited in areas to change color by irradiation by means of the laser. Advantageously, several such layers are provided here, which bring about different color changes. Thus, it is possible for example to introduce multi-colored images as code element 3 into the film element 11 by means of a laser.

Further, it is also possible for the second code element 3 to be introduced into the film element 11 by means of a digital printing process, in particular by means of inkjet printing or thermal-transfer printing, Thus, it is possible for example for one or more of the decorative layers 112 to be applied in an individualized manner by means of inkjet printing or thermal-transfer printing, and for the second code element 3 to be formed by the corresponding shaping of this layer.

Further, it is also possible, as already described above, for the film element 11 to be stamped in an individualized manner out of a transfer film, and thus for the outline of the film element 11 to form the second code element 3 or to form part of the information of the second code element 3.

The overprint 12 is preferably formed by means of a digital printing process, in particular by means of inkjet printing or thermal-transfer printing 12. Here, the overprint 12 can have not only one layer, but also two or more layers, of which preferably at least one layer is applied by means of a digital printing process. It is also possible for one or more further layers of the overprint to be applied by means of a printing process such as gravure printing, screen printing or offset printing or intaglio printing. The one or more layers of the overprint 12 preferably consist of a binder, to which among other things dyes and/or pigments are added. Possible dyes and pigments correspond to the dyes and pigments already mentioned above with respect to the decorative layer 112 and can among other things also comprise optically variable pigments, in order thus to further improve the protection against forgery.

Figure 2A:
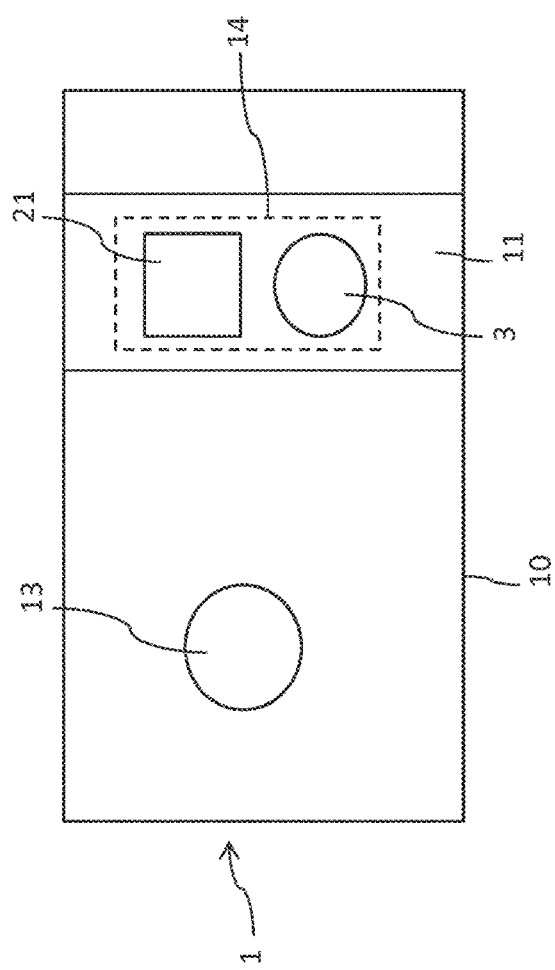
FIG. 2a shows a schematic top view of an object.
Figure 2B:
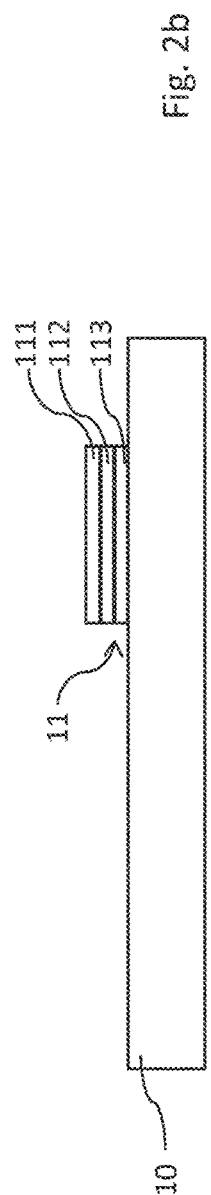
FIG. 2b.
Figure 2C:

FIG. 2a to FIG. 2c show a further embodiment example with an object 1, on which or into which a first partial code element 21 and a second code element 3 are introduced. FIG. 2a here shows the object 1 in top view. FIG. 2b shows the object 1 in a sectional representation, wherein here the first partial code element 21 and the second code element 3 are arranged on a carrier substrate 10 of the object 1. FIG. 2c shows a sectional representation of a variant in which the first partial code element 21 and the second code element 3 are arranged in a carrier substrate 10 of the object 1.

The object 1 is for example a security element, for example the security element 1 according to FIG. 1a and FIG. 1b. Further, it is also possible for the object 1 to be an object of a different type, for example a product, a product label, a packaging, an injection-molded part or a housing.

The object 1 here preferably has several security features, of which a security feature 13 is shown in FIG. 2a. Further, the object 1 has a film element 11, which is applied to or introduced into a carrier substrate 10 of the object 1. The film element 11 thus further also forms a security element to which or into which the first partial code element 21 and the second code element 3 are applied or introduced within an area 14.

The film 11 is formed like the film 11 according to FIG. 1a and FIG. 1b, thus reference is made to the statements in this respect. The first partial code element 21 and the second code element 3 here are, as described above for the film element 11 according to FIG. 1a and FIG. 1b with respect to the second code element 3, introduced into or applied to the film element 11, with the result that reference is made to the preceding statements in this respect.

With respect to the embodiment variant according to FIG. 2c, it is further advantageous if the film element 11 is exposed in the area 14 on at least one surface of the carrier substrate 10, In other words, the carrier substrate 10 in the area 14 has a corresponding recess and/or the film element 11 in this area is guided onto the surface of the carrier substrate 10. The optical visibility of the film element 11 in the area 14 is hereby ensured. However, it is further also possible for the carrier substrate 10 to be formed correspondingly transparent, and thus for the first partial code element 21 and the second code element 3 to be optically recognizable through the carrier substrate 10 in particular when observed in reflection and/or when observed in transmission.

Figure 3:
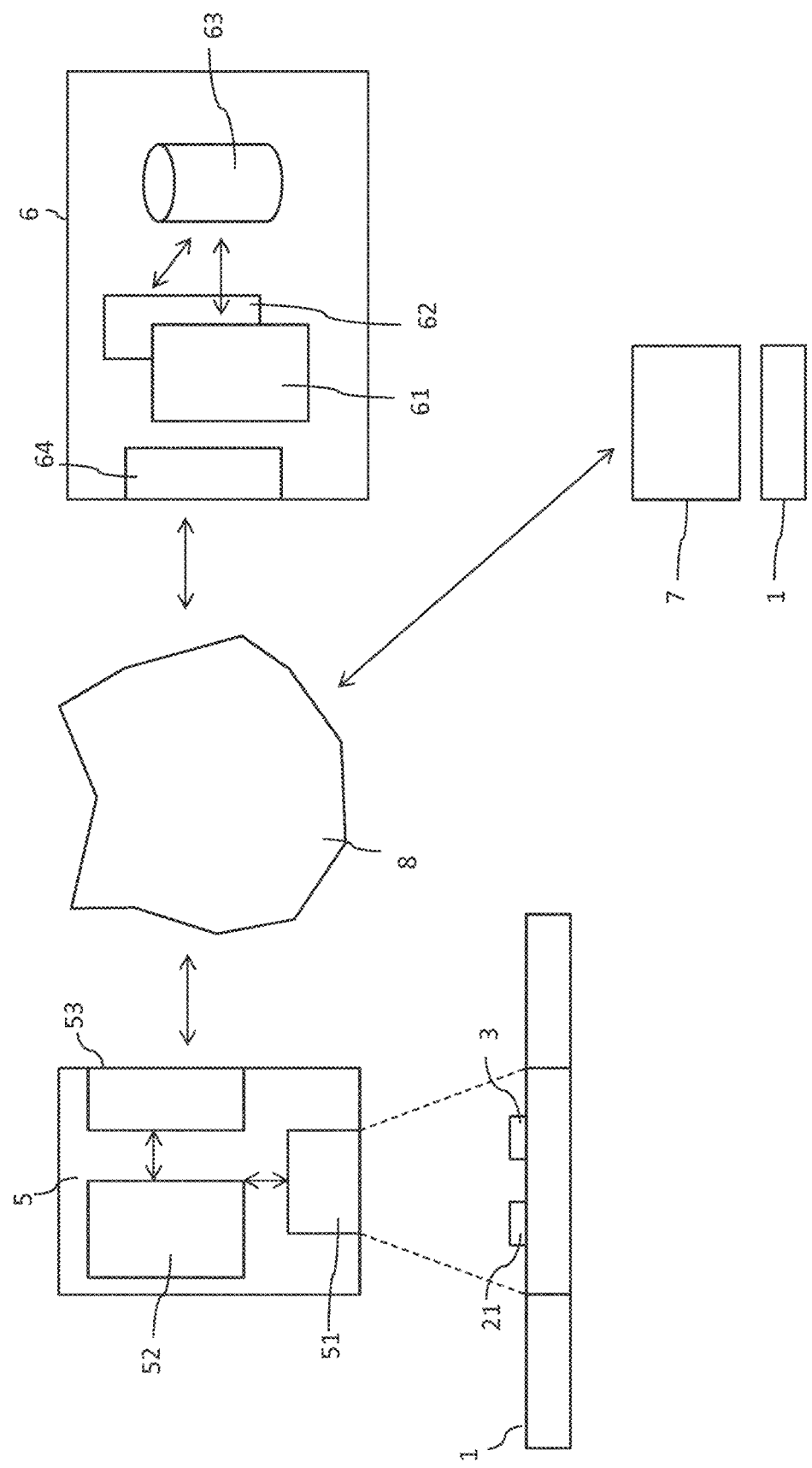
FIG. 3 shows a schematic representation of a system for carrying out an authentication method.

With reference to FIG. 3, a method for authenticating the security element 1 according to FIG. 1a and FIG. 1b or the object 1 according to FIG. 2a to FIG. 2c is now explained by way of example:

FIG. 3 shows the security element or the object 1 with a first partial code element 21 and a second code element 3. The security element or the object 1 can be formed for example as described in the preceding FIG. 1a, FIG. 1b, FIG. 2a, FIG. 2b and FIG. 2c, FIG. 3 further shows a reader 5, a communications network 8, a server 6 and an individualization device 7.

When the authentication method is carried out, the following steps are preferably carried out here:

A first code element 2 is divided into at least the first partial code element 21 and a second partial code element 22, The second partial code element 22 is stored.

Further, an arrangement of the first partial code element 21 and the second code element 3 is then jointly machine-captured by means of the reader 5. The first partial code element 21 and the second code element 3 are then extracted from the data captured by the reader 5. Access to the stored second partial code element 22 is then effected using the second code element 3 as a key. It is then checked whether the code element resulting from merging the extracted first partial code element 21 and the stored second partial code element 22 corresponds to the first code element 20.

The extraction of the first partial code element 21 and the second code element 3 and the check are preferably carried out by the server 6. However, it is also possible for this function to be provided by the reader 5.

Further, the individualization device 7 is preferably used in order to apply or introduce the first partial code element 21 and the second code element 3, as described with respect to the figures FIG. 1a to FIG. 2c, to or into the security element or object 1. However, it is also possible for only one of the two code elements to be applied to or introduced into the security element or the object 1 and for the other code element not to be arranged on the security element or object 1 in a corresponding manner to the other code element until during the machine capture by the reader 5.

The reader 5 preferably has a control device 52, a sensor 51 and a communications device 53.

The sensor 51 preferably consists of a camera, which optically captures the area 14 in which the first partial code element 21 and the code element 3 are arranged.

The communications device 53 serves for communication via the communications network 8. This communications device 53 is thus formed for example of corresponding hardware and software components of the reader 5, which make communication, for example IP-based communication, over a radio network possible (IP=Internet Protocol).

The control device 52 consists of hardware and software components of the reader 5, which control the carrying out of the previously described method.

The communications network 8 is preferably an IP-based communications network.

The server 6 has a communications device 64, several services 61 and 62 as well as a database 63, which the services 61 and 62 access.

The communications device 64 is formed like the communications device 53, with the result that reference is made to the statements in this respect.

The services 61 and 62 are formed of software and/or hardware components of the server 6, which make it possible to carry out the services 61 and 62 described in the following. It is also possible here for the services 61 and 62 to be formed entirely of software components and control programs, which provide the functions described regarding this when carried out on a corresponding hardware platform.

The database 63 is not necessarily arranged inside the server 6. Here, it can be an internal or external database which is arranged for example spatially separated from the carrying out of the services 61 and 62.

The individualization device 7 is, preferably lasers, printing devices, personalization devices and/or thermal-transfer, hot-stamping or cold-stamping devices, which, as described above for FIG. 1a to FIG. 2c, introduce or apply the first partial code element 21, and the second code element 3, into or to the security element or the object 1.

The first code element 2 and the second code element 3 preferably consist of a sequence of alphanumeric characters, a sequence of numbers, a barcode, in particular a two-dimensional barcode, or a QR code and/or a monochromatic or multi-colored image, in particular a graphic or a true-color image.

If the first code element 2 consists for example of a sequence of characters, the procedure can be as follows:

Firstly, a sequence of alphanumeric characters, for example a number 1 2 3 4 5 6 7 8, is generated as first code 20. From this, a checksum X is calculated and the sequence of alphanumeric characters is completed with the checksum (e.g. 1 2 3 4 5 6 7 8 X). This completed sequence of alphanumeric characters here forms for example the first code element 2. The first code element 2 is now divided into two parts, for example into the first partial code element 21 with the sequence of alphanumeric characters 1, 2, 3, 4 and the second partial code element 22 with the sequence of alphanumeric characters 5 6 7 8 X.

Further, the second code element 3 is generated, which contains a key which can be read preferably only by defined readers. The second code element 3 thus consists for example of the sequence of alphanumeric characters A, B, C, D. Then the second partial code element (5 6 7 8 X) including the checksum is stored in the database 63, and the second code element 3 (A B C D) for access to this dataset in the database 63 is defined. Then the first partial code element 21 (1 2 3 4) is applied to the security element or object 1 and the second code element 3 (A B C D) is applied to the security element or object 1 close to the first partial code element 21. This is effected by means of the individualization device 7.

For the authenticity check, the security element or the object 1 is scanned in the area 14 by the sensor 51. A dataset generated by means of this scan, preferably an image dataset containing the first partial code element 21 (1 2 3 4) and the second code element 3 (A B C D), is then transmitted to the server 6 by the control device 52.

The information contained in the dataset with respect to the first partial code element 21 and the code element 3 is extracted from the transmitted dataset by the server 6, for example by means of text recognition. Then the database 63 is accessed using the second code element 3 (A B C D) and the assigned second partial code element 22 (5, 6, 7, 8, X) is read. Then the two sequences of alphanumeric numbers of the partial code elements 21 and 22 are merged again, and with reference to the checksum it is determined whether the thus-formed merge corresponds to the first code element 2, i.e. matches it. A corresponding message (TRUE or FALSE) is then sent to the reader 5.

The checksum here can be calculated for example using the so-called "Luhn algorithm". From the last number back towards the front, every second line is doubled. The digit sum is then generated. This is then multiplied by the number of digits and modulo 10 is applied to the result.

The functions set out above are preferably carried out by the reader 5, the individualization device 7 and the services 61, 62, as explained in the following with reference to the flow diagrams shown in FIG. 4a and FIG. 4b:

A query which contains a first code 20 is sent by the individualization device 7 to the service 61. From this, the service 61 generates the first code element 2, divides the first code element 2 into the first partial code element 21 and the second partial code element 22 and generates the second code element 3. The second code element 3 and the second partial code element 22 and optionally still further information for the check are then stored in the database 63, Then, as a response to the query, the first partial code element 21 and the second code element 3 are transmitted by the service 61 to the individualization device 7. These are then applied to or introduced into the security element or the object 1, as explained above, by the individualization device 7.

The reader 5 captures, by means of the sensor 51, an image dataset 910, which comprises an optical copy of the area 14 with the first partial code element 21 and the second code element 3. This image dataset 910 is sent by the reader 5 in a query 91 to the service 62. From the image dataset 910 the service 62 extracts the first partial code element 21 and the second code element 3. On the basis of the second code element 3 as a key, the service 62 accesses the database 63 and obtains from it the assigned second partial code element 22. Then the service 62 merges the extracted first partial code element 21 and the stored second partial code element 22 and checks whether the hereby resulting code element corresponds to the first code element 2. Then the service 62 sends a corresponding notification 92 to the reader 5, which transmits the result of the authentication, for example "TRUE" or "FALSE".

In the following, with reference to the figures FIG. 5*a* to FIG. 5*j*, an embodiment example is described in which a two-dimensional barcode in particular a QR code, is used as first code element 2 and as second code element 3.

Figure 5C:
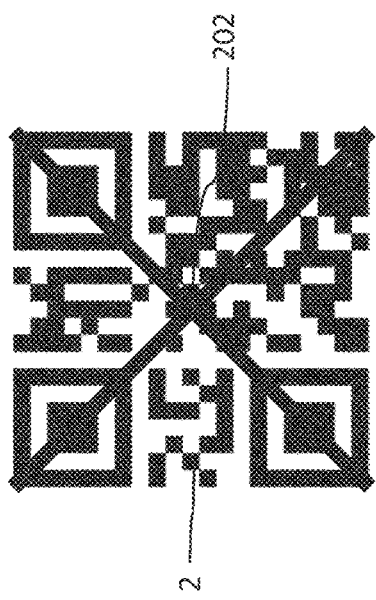
Figure 5D:
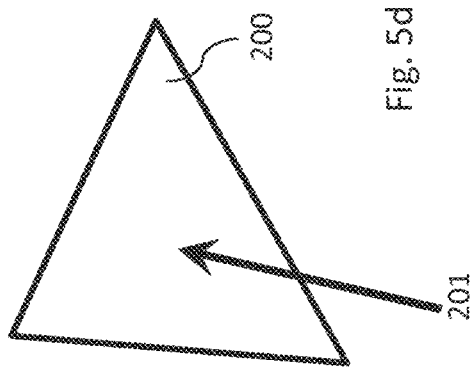
Figure 5A:
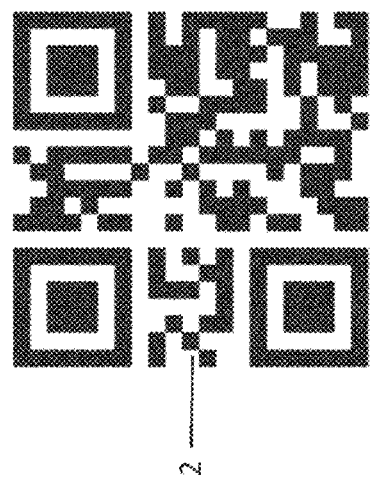
Figure 5B:
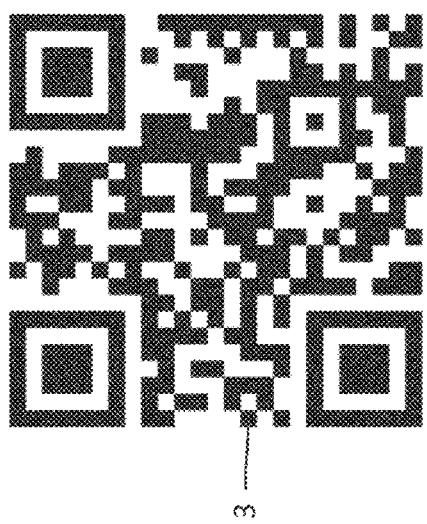

In this embodiment example, a preferably unique sequence of alphanumeric characters is firstly generated as first code 20. The first code 20 is now converted into a corresponding QR code, which forms the first code element 2, in a first step. Thus, for example, FIG. 5*e* shows a corresponding representation of the first code element 2 in its formation as a two-dimensional barcode.

Further, a second code 30 or key is generated for an assigned dataset in the database 63, which uniquely identifies it. This key or second code 30, which is preferably present in a sequence of numeric or alphanumeric characters, is then likewise converted into a two-dimensional barcode, which forms the second code element 3. FIG. 5*b* shows an example of such a code element 3 in the form of a two-dimensional barcode.

The first code element 2 is then divided. For this, the procedure is preferably as follows:

Firstly, a reference point 202 of the first code element 2 is determined. Preferably, the center of area of the second code element 3, as is shown for example in FIG. 5*c*, is chosen here as reference point 202.

Then a template 200 is determined. The template 200 here can be generated randomly or pseudo-randomly or selected randomly or pseudo-randomly from a predefined group of templates. However, it is also possible to use the same template multiple times. FIG. 5*d* shows by way of example a corresponding template 200, here in the form of a triangle.

A reference point 201 of the template 200 is then determined. The center of area of the template 200 is preferably also chosen for this, as is shown by way of example in FIG. 5*d*.

The template 200 is then applied to the first code element 2. For this, as described in the following, the procedure is preferably:

The template 200, as indicated in FIG. 5*e*, is thus superimposed with the first code element 2, This superimposition here is preferably effected on the basis of the reference point 201 of the template 200 and the reference point 202 of the first code element 2. Preferably, the two reference points 201 and 202 are thus made to overlap during the superimposition, and thus the template is positioned on the first code element 2 on the basis of the reference points 201 and 202.

The partial area of the first code element 2 in which the template 200 does not superimpose the first code element 2 is then assigned to the first partial code element 21. The partial area of the first code element 2 in which the first code element 2 is superimposed by the template 200, on the other hand, is assigned to the second partial code element 22.

Figure 5G:
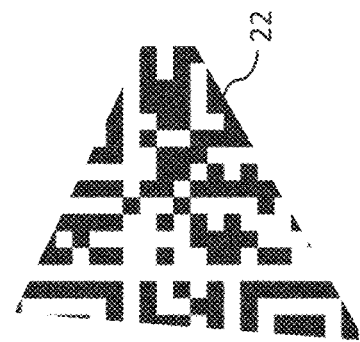
Figure 5E:
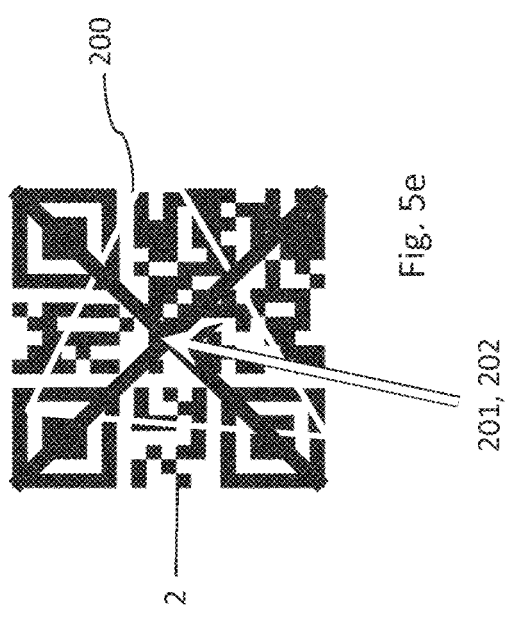
Figure 5F:
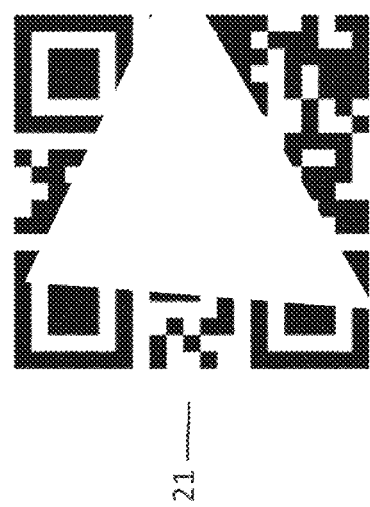

FIG. 5*f* and FIG. 5*g* illustrate the corresponding result of a division on the basis of the application of the template 200: FIG. 5*f* shows the first partial code element 21, which has the partial area not superimposed by the template 200. FIG. 5*g* shows the second partial code element 22, which has the partial area of the first code element 2 superimposed by the template 200.

The first partial code element 21 and the code element 3 are then transmitted to the individualization device 7 by the server 6. It is also possible here for the first partial code element 21 and the code element 3 to be transmitted to the individualization device 7 in a common image dataset, as shown in FIG. 5*h*. The first partial code element 22 and the second code element 3 are now applied to or introduced into the security element or the object 1 by the individualization device 7, as shown in FIG. 5*i*.

A corresponding image dataset 910 comprising the image information represented for example in FIG. 5*i* is then sent after joint machine capture by the reader 5 to the server 6, wherein the server 6 extracts from this image dataset 910 the partial code element 21 and the code element 3 for example by means of image processing and/or image recognition algorithms. For this, for example, the image area of the image dataset which is assigned to the second code element 3 is processed by means of a barcode recognition and from the barcode the sequence of alphanumeric characters assigned to it is ascertained, which is used to access the second partial code element 22.

Further, the part of the image dataset 910 assigned to the first partial code element 21 is preferably extracted as a corresponding partial image dataset. Then a merging with the second partial code elements 22 stored in the database 63 is carried out. For this, the extracted first partial code element 21 is superimposed with the stored second partial code element 22, preferably on the basis of the stored reference points 201 and 202. This is shown for example in FIG. 5*j*, In this case, this is effected by corresponding addition of the two image datasets of the extracted first partial code element 21 and of the stored second partial code element 22, on the basis of a corresponding positioning according to the reference points 201 and 202, The result of this merging, the code element 23, is now subjected to a barcode recognition. The sequence of alphanumeric characters resulting from this is compared with the sequence of alphanumeric characters which corresponds to the first code 20. This check can further also be effected on the basis of a checksum of the first code 20 and the checksum which is determined from the sequence of characters resulting from the code element 23 after barcode recognition.

If the two sequences of alphanumeric characters or the checksums match, a corresponding "TRUE" message is sent to the reader 5, otherwise a "FALSE" message is sent.

In the following, with reference to the figures FIG. 6*a* to FIG. 6*f*, an embodiment example is described in which an image in the form of a graphic is used as first code element 2 and a barcode is used as second code element 3.

Firstly, a graphic, which can be formed for example like the one represented in FIG. 6*a*, is generated as first code element 2, Here too, it is possible to generate this graphic randomly or pseudo-randomly, to select it randomly or pseudo-randomly from a group of predefined graphics, or else to use the same graphic for several objects.

Subsequently, the division of the first code element 2 into the first partial code element 21 and the second partial code element 22 is effected. For this, the procedure is preferably the same as described above for the embodiment example according to FIG. 5, namely a template 200 is applied to the first code element 2. Here too, the determination of a reference point 201 of the template 200 and of a reference point 202 of the first code element 2 is preferably effected, FIG. 6*a* thus shows by way of example the determination of the reference point 202 of the first code element 2. FIG. 6*b* shows by way of example a possible template 200 with the reference point 201, which is made to overlap with the first code element 2. FIG. 6*c* shows the first partial code elements 21 and second partial code elements 22 resulting hereby.

Then, as already described in detail above for the embodiment example according to FIG. 5, the second code element 3 is generated in the form of a barcode and, as shown in FIG. 5, the first partial code element 21 and the second code element 3 are transmitted to the individualization device 7 and correspondingly applied to and/or introduced onto the security element or the object 1.

The further process is also as described for embodiment example 5: Thus, from the common image dataset 910 captured by the reader 5, the first partial code element 21 and the second code element 3 are extracted, the second partial code element 22 is hereby read from the database 63 and the first and second partial code elements, as shown in FIG. 6f, are merged, resulting in the code element 23. The check of the match of the code element 23 with the first code element 2 is here effected for example by a corresponding image comparison of the two image datasets or by comparison of corresponding checksums which are generated by these image datasets.

With reference to the figures FIG. 7a to FIG. 9c, an embodiment example is now described in which a multi-colored image is used as first code element 2.

Firstly, a first code element 2 is generated which in this case is formed of a colored true-color image, for example a photograph. Here too, it is possible for this image to be generated or modified randomly or pseudo-randomly, or for it to be selected randomly or pseudo-randomly from a group of predefined images.

In this case, a template 200, which assigns a first part of the spectrum of the first code element 2 to the first partial code element 21 and the remaining part of the spectrum to the second partial code element 22, is now applied to the first code element 2. In the present example, one of the color channels R, G, B of an RGB image, for example the red channel, the green channel or the blue channel, is used here as part of the spectrum, Thus, for example, the spectrum of the red and green channels is assigned to the first partial code element 21 and the spectrum of the blue channel is assigned to the second partial code element 22. FIG. 7a shows a corresponding embodiment example of a code element in the form of a true-color image in which the red and green channels of the image form the first partial code element 21 and the blue channel forms the second partial code element 22.

Further, it is also possible for the partial spectrum not to be geared to the red, green and blue channels of an RGB image, but to be chosen as desired.

Then, on the basis of the thus-formed first and second partial code elements 21 and 22, and of a second code element 3 formed as a barcode, the process corresponds to that in the embodiment example according to FIG. 5 and FIG. 6. The first partial code element 21 and the second code element 3, as indicated in FIG. 7b, are applied to or introduced into the security element or the object 1.

From the image dataset 910 jointly captured by the reader 5, the first partial code element 21 and the second code element 3 are subsequently extracted, as described regarding this in the embodiment examples according to FIG. 5 to FIG. 6, and the first and second partial code elements 21, 22 are merged. For this, the image datasets of the two partial code elements 21 and 22 are superimposed correspondingly in register, and by means of carrying out a corresponding image comparison, as set out above, it is ascertained whether there is a match here.

Correspondingly, the process in the embodiment example according to FIG. 8a to FIG. 8c, and according to FIG. 9a to FIG. 9c, is:

Thus, FIG. 8a and FIG. 9a show corresponding different embodiment examples of a first code element 2 formed as a true-color image and the corresponding partial code element 21 and 22, of which one comprises the red and green channels and the other comprises the blue channel. Further, the partial spectra 24, 25 and 26 of the true-color image, which are contained or superimposed in the code elements 2, the first partial code element 21 or the second partial code element 22, are indicated.

FIG. 8b and FIG. 9b show a corresponding arrangement of this thus-formed first code element 21 and the second code element 3 on the object 1. FIG. 8c and FIG. 9c illustrate the merging of the first partial code element 21 and the second partial code element 22 to form the code element 23.

LIST OF REFERENCE NUMBERS 1 object, security element
10 carrier substrate
100 security document
11 film element
111 protective layer
112 decorative layer
113 adhesive or adhesion-promoting layer
12 overprint
13 security feature
14 area
2 code element
20 code
200 template
201 reference point
202 reference point
21 partial code element
22 partial code element
23 code element
24, 25, 26 partial spectrum
3 code element
30 second code
5 reader
51 sensor
52 control device
53 communications device
6 server
61 service
62 service
63 database
64 communications device
7 individualization device
8 communications network
91 query
910 image dataset
92 notification

The invention claimed is:

1. A method for authenticating an object for protecting value documents, ID documents and products, comprising the steps:
dividing a first code element into at least one first partial code element and one second partial code element,
storing the second partial code element,
arranging the first partial code element and a second code element on and/or in the object,
jointly machine-capturing the first partial code element and the second code element by means of a reader,
extracting the first partial code element and the second code element from the data captured by the reader,
accessing the stored second partial code element using the second code element as a key, checking whether the code element resulting from merging the extracted first partial code element and the stored second partial code element corresponds to the first code element.
2. The method according to claim 1, wherein
the first code element is a sequence of alphanumeric characters, a sequence of numbers, a barcode, or a QR code and/or a monochromatic or multi-colored image.
3. The method according to claim 1, wherein
the second code element is a sequence of alphanumeric characters, a sequence of numbers, a barcode, or a QR code and/or a monochromatic or multi-colored image.
4. The method according to claim 1, wherein
the first partial code element and the second code element are arranged next to each other on and/or in the object.
5. The method according to claim 1, wherein
the first partial code element and the second code element are arranged within an area the lateral dimensions of which lie between 50 mm and 150 mm.
6. The method according to claim 1, wherein
the first partial code element and/or the second code element are introduced into at least one film element of the object and/or applied to at least one film element of the object.
7. The method according to claim 6, wherein
the at least one film element has one or more layers which, individually or in combination, have an optically active relief structure, a diffraction grating, a hologram, a zero-order diffraction structure, a blazed grating, a macrostructure, a lens structure or microprism structure, a mirror surface, a matte structure, an anisotropic or isotropic matte structure, a volume hologram, a thin-film structure with color-change effect, a liquid crystal material, luminescent pigments, thermochromic pigments and/or optically variable pigments.
8. The method according to claim 6, wherein
the at least one film element is formed of the transfer ply of a hot-stamping film or cold-stamping film, a laminating film or a security thread.
9. The method according to claim 6, wherein
the first partial code element and/or the second code element are introduced into the film element by means of a laser.
10. The method according to claim 6, wherein
the first partial code element and/or the second code element are introduced into the film element by means of a digital printing process.
11. The method according to claim 6, wherein
the first partial code element and/or the second code element are applied to the at least one film element by means of a digital printing process.
12. The method according to claim 6, wherein
the first partial code element and/or the second code element are introduced into the at least one film element by individualized stamping of the film element out of a transfer film.
13. The method according to claim 1, wherein
a checksum of the first code element is ascertained and this checksum is stored for the second partial code element or as part of the second partial code element.
14. The method according to claim 13, wherein,
during the check of whether the code element resulting from merging the extracted first partial code element and the stored second partial code element corresponds to the first code element, a checksum of the code element resulting from the merging is ascertained and this checksum is compared with a checksum of the first code element stored for the second partial code element or as part of the second partial code element.
15. The method according to claim 1, wherein
the method further comprises the following step:
generating the first code element in such a way that the first code element contains or forms a bijective first code.
16. The method according to claim 1, wherein
the step of dividing the first code element comprises the following steps:
generating and/or selecting a template,
dividing the first code element into the at least one first partial code element and the second partial code element by applying the template to the first code element.
17. The method according to claim 16, wherein
the template is randomly or pseudo-randomly generated and/or is randomly or pseudo-randomly selected from a set of predefined templates.
18. The method according to claim 16, wherein
the template is superimposed with the first code element, covering the reference point of the first code element and the reference point of the template.
19. The method according to claim 16, wherein
the template is formed of an optical filter function which defines one or more filter criteria preferably depending on location.
20. The method according to claim 19, wherein
the one or more filter criteria are selected from the group: lightness value, contrast value, color value, spectral region and/or polarization.
21. The method according to claim 16, wherein,
when the template is applied to the first code element, the filter function of the template is superimposed with the first code element, and, for the division of the first code element, depending on location or independently of location, a first part of the spectrum of the first code element determined by the one or more filter criteria of the template is assigned to the first partial code element and the remaining part is assigned to the second partial code element.
22. The method according to claim 16, wherein
when the template is applied to the first code element, the filter function of the template is superimposed with the first code element, and, for the division of the first code element, depending on location, image points of the first code element are assigned to the first partial code element or to the second partial code element depending on whether one or more filter criteria of the template are met.
23. The method according to claim 16, wherein
the template is superimposed with the first code element, and for the division of the first code element the partial area of the first code element in which the template and the first code element are superimposed is assigned to the first partial code element, and the partial area of the first code element in which the template and the first code element are not superimposed is assigned to the second partial code element, or vice versa.
24. The method according to claim 16, wherein
the template is superimposed with the first code element in such a way that the bijection of the first code element no longer exists.
25. The method according to claim 16, wherein
merging the extracted first partial code element and the stored second partial code element is carried out by means of superimposition of the extracted first partial code element and the stored second partial code element.

26. The method according to claim 16, wherein to carry out the check by means of carrying out a barcode and/or text recognition from the image dataset corresponding to the merging, a sequence of alphanumeric characters corresponding to this is determined and compared with the first code, the first code element and/or the checksum thereof is compared with the checksum of the first code or of the first code element.

27. The method according to claim 16, wherein, to carry out the check by means of carrying out an image recognition from the image dataset corresponding to the merging, one or more characteristic values specifying this are determined and these are compared with corresponding characteristic values specifying the first code element.

28. The method according to claim 16, wherein, to carry out the check by means of carrying out an image comparison, the image dataset corresponding to the merging is compared with the image dataset corresponding to the first code element.

29. The method according to claim 16, wherein the second partial code element, the reference point of the second code element, the reference point of the template, the second code element, the second code and/or the key assigned to the second code element are stored in a common dataset.

30. The method according to claim 16, further comprising:
determining a reference point of the template,
wherein the template is applied to the first code element on the basis of the reference point of the template.

31. The method according to claim 16, further comprising:
determining a reference point of the first code element,
wherein the template is applied to the first code element on the basis of the reference point of the first code element.

32. The method according to claim 1, wherein the method comprises the following step:
generating the second code element in such a way that the second code element forms a key assigned to the first code element and/or a bijective second code.

33. The method according to claim 1, wherein the method comprises the following step:
generating a bijective second code and generating the second code element from the second code.

34. The method according to claim 1, wherein the method comprises the following step:
storing the second code element, the second code and/or the key assigned to the second code element.

35. The method according to claim 1, wherein the second partial code element, as well as the second code element, the second code and/or the key assigned to the second code element are stored in a database, wherein the second partial code element, in the database are assigned to the second code element, the second code and/or the key assigned to the second code element.

36. The method according to claim 1, wherein a first code is generated in the form of a sequence of alphanumeric numbers, and wherein, by converting the first code into a barcode, the first code element is generated, and wherein the barcode forming the first code element is divided by means of a template and an image dataset is generated here which contains the first partial code element and wherein a barcode recognition is applied to the image dataset corresponding to the merging and wherein, during the check, the sequence of characters resulting from the barcode recognition is then compared for whether it corresponds to the sequence of alphanumeric characters of the first code.

37. The method according to claim 1, wherein an image dataset containing a graphic or a true-color image is generated as first code element and wherein the graphic or true-color image forming the first partial code element is divided by means of a template and an image dataset is generated here which contains the first partial code element, and wherein, during the check by means of carrying out an image comparison the image dataset corresponding to the merging is compared with the image dataset corresponding to the first code element.

38. A server for authenticating an object by carrying out the method according to claim 1, wherein the server is designed such that it divides a first code element into at least one first partial code element and one second partial code element, stores the second partial code element and a second code element serving for access to the second partial code element or a second code assigned thereto in an internal or external database, and sends the first partial code element and/or the second code element to an individualization device for arranging the first partial code element and/or the second code element on the object.

39. A server for authenticating an object by carrying out the method according to claim 1, wherein the server is designed such that it receives from a reader data which contain a joint machine capture of a first partial code element and a second code element by the reader, that it extracts the first partial code element and the second code element from the data captured by the reader, that it accesses a stored second partial code element using the second code element as a key, and that it checks whether the code element resulting from merging the extracted first partial code element and the stored second partial code element corresponds to the first code element.

40. The server according to claim 39, wherein the server is further designed such that it transmits a message to the reader containing the result of the check.

41. An individualization device for individualizing an object by carrying out the method according to claim 1, wherein the individualization device is designed such that it arranges at least one first partial code element and/or one second code element in and/or on the object, wherein the first partial code element is formed by dividing a first code element into the at least one first partial code element and one second partial code element, which is stored in a database.

42. The individualization device according to claim 41, wherein
the individualization device is designed such that it generates a first code or the first code element and sends it to a server, which generates from the first code the first code element and/or divides the first code element into at least one first partial code element and one second partial code element and stores the second partial code element and a second code element serving for access to the second partial code element or a second code assigned thereto in an internal or external database, and that it receives from the server the first partial code element and/or the second code element for arrangement on the object.

43. The individualization device according to claim 41, wherein
   the individualization device is designed such that it divides the first code element into the at least one first partial code element and the second partial code element, and stores the second partial code element and a second code element serving for access to the second partial code element or a second code assigned thereto in an internal or external database.

44. A reader for authenticating an object by carrying out the method according to claim 1, wherein the reader is designed such that it jointly machine-captures at least one first partial code element and one second code element, wherein the first partial code element is formed by dividing a first code element into the at least one first partial code element and one second partial code element, which is stored in a database.

45. The reader according to claim 44, wherein
   the reader is designed such that it sends data which contain the joint machine capture of the first partial code element and the second code element by the reader to a server, which extracts the first partial code element and second code element from the data captured by the reader, accesses the stored second partial code element using the second code element as a key and checks that the code element resulting from merging the extracted first partial code element and the stored second partial code element corresponds to the first code element.

46. The reader according to claim 44, wherein
   the reader is designed such that it extracts the first partial code element and the second code element from the data captured by the reader, accesses the stored second partial code element using the second code element as a key and checks whether the code element resulting from merging the extracted first partial code element and the stored second partial code element corresponds to the first code element.

47. A security element for protecting value documents, ID documents and products, for use in a method according to claim 1, wherein the security element has at least one first partial code element and/or one second code element, wherein the first partial code element is formed by dividing a first code element into the at least one first partial code element and one second partial code element, which is stored in a database, wherein the first partial code element and/or the second code element are arranged in and/or on the security element in such a way that by joint machine capture of the first partial code element and the second code element by means of a reader and extraction of the first partial code element and the second code element from the data captured by the reader it can be checked whether the code element resulting from merging the extracted first partial code element and the stored second partial code element corresponds to the first code element.

48. A security document, with a security element according to claim 47.

* * * * *